Feb. 12, 1935.  H. B. CLAAR ET AL  1,990,526
BALING PRESS
Filed Sept. 21, 1931   8 Sheets-Sheet 1
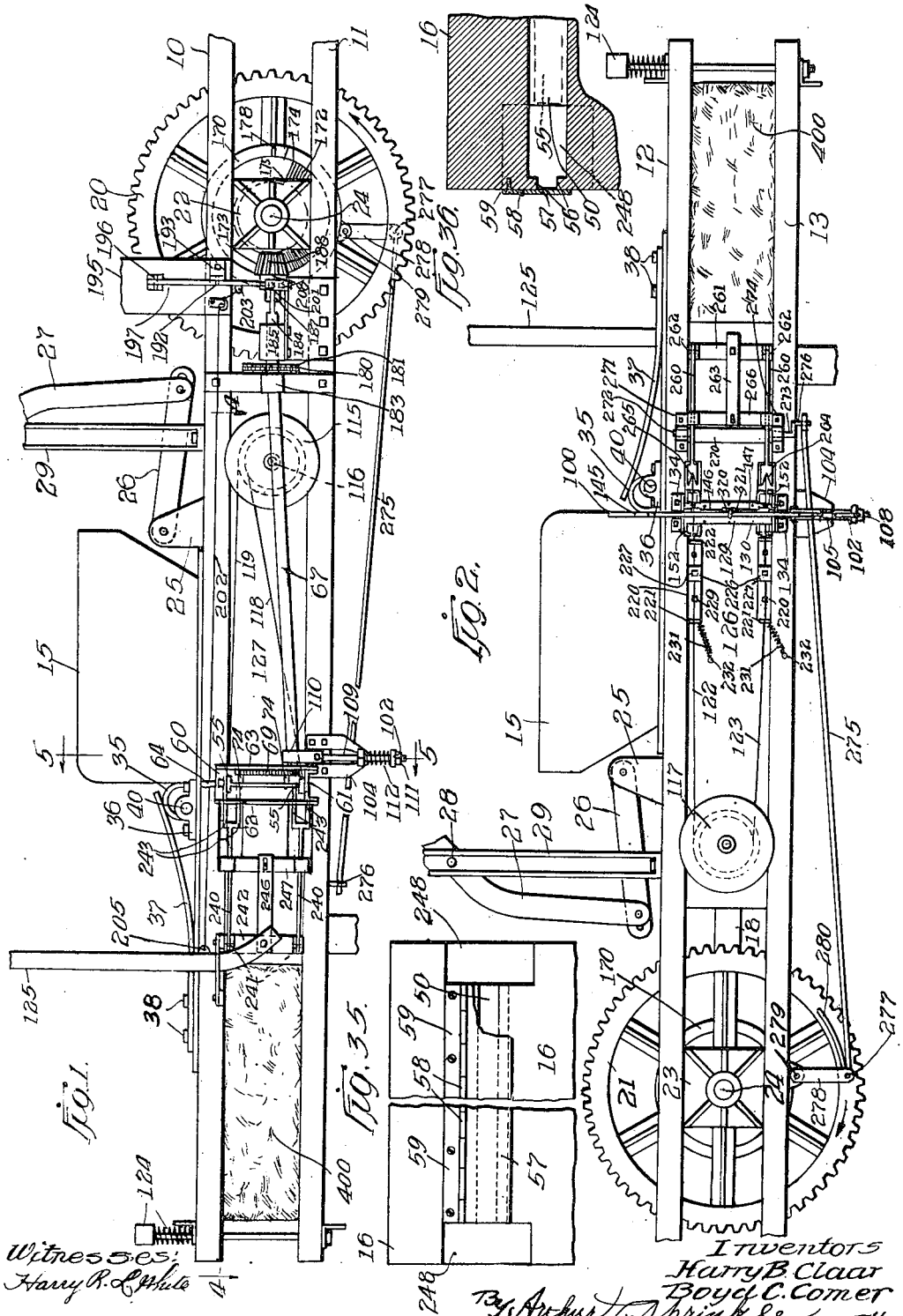

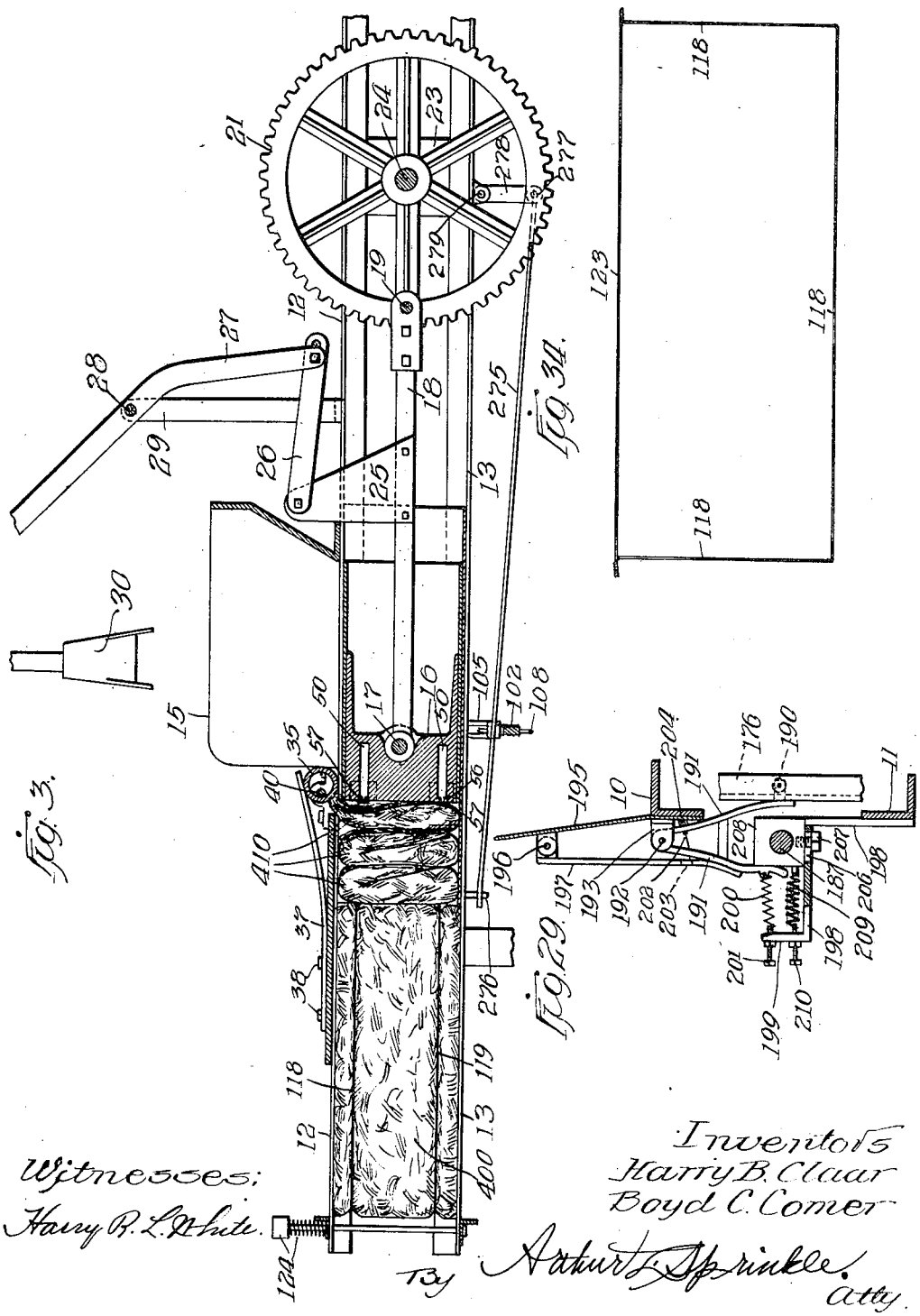

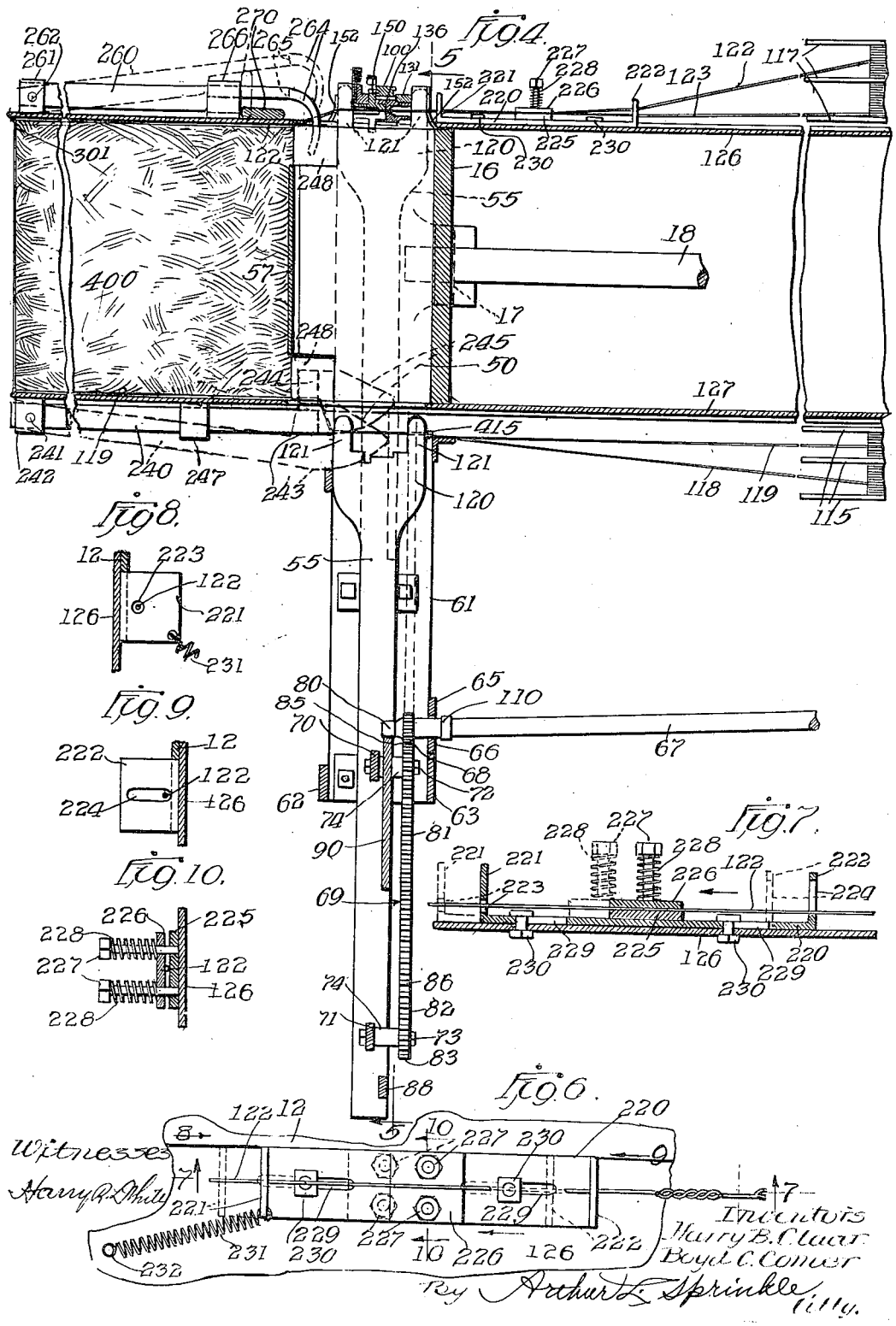

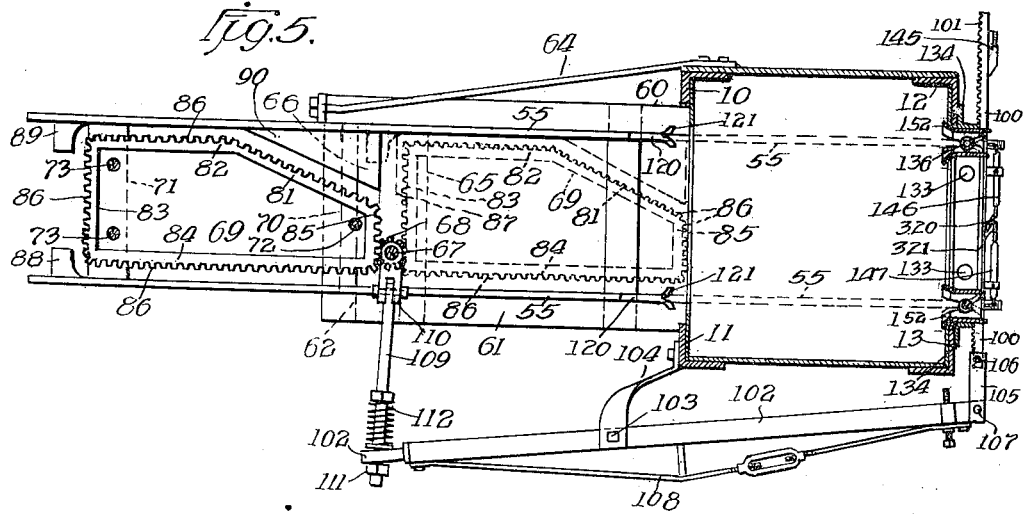

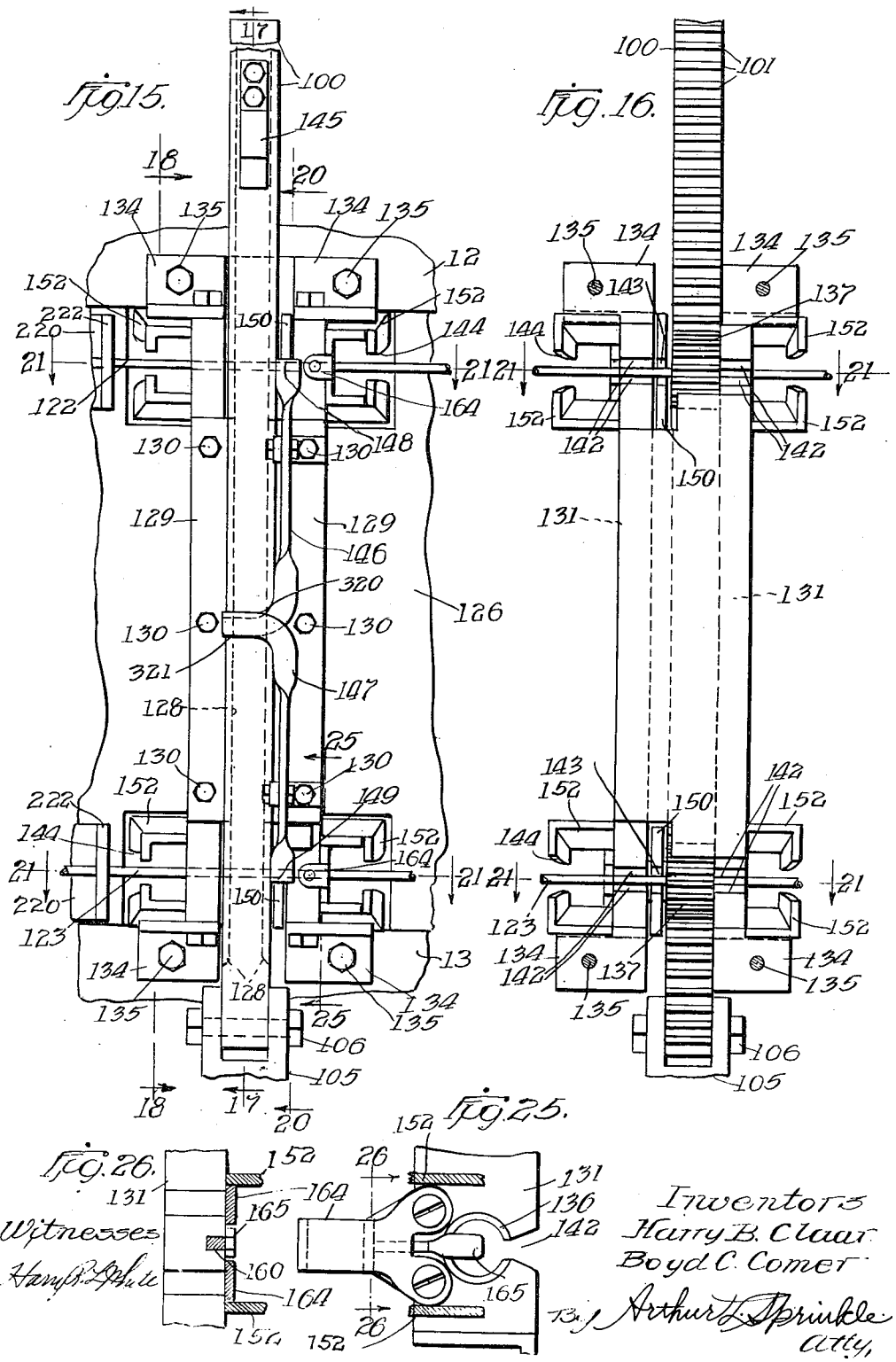

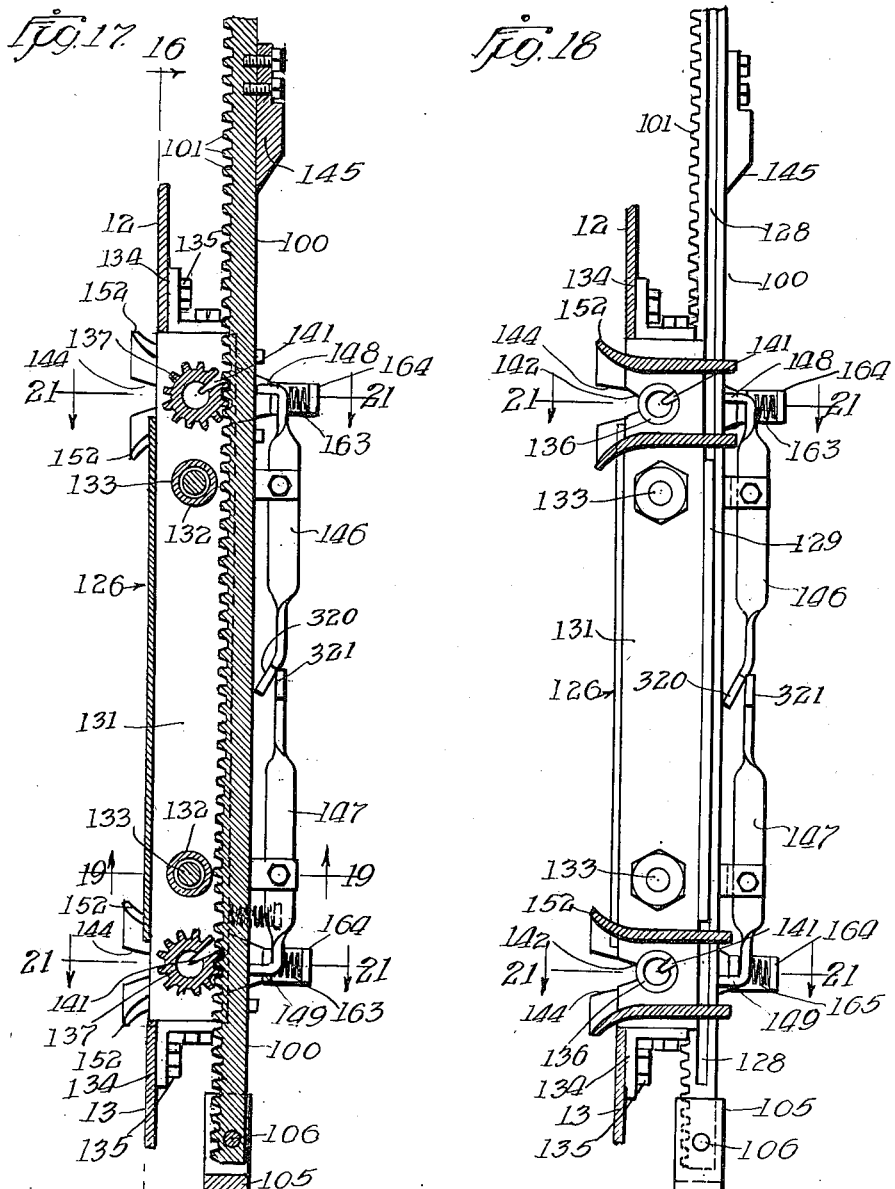

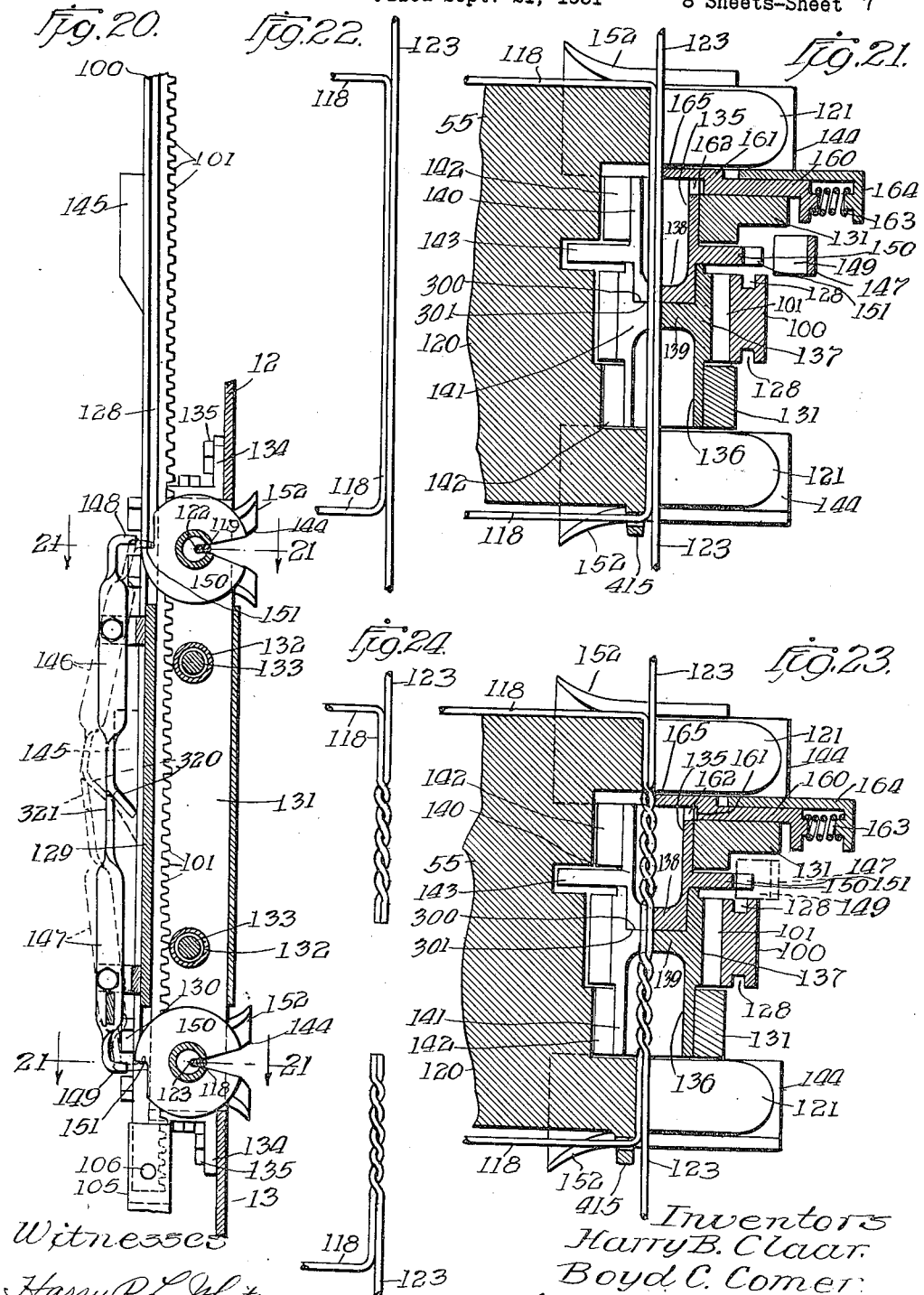

Feb. 12, 1935. H. B. CLAAR ET AL 1,990,526
BALING PRESS
Filed Sept. 21, 1931 8 Sheets-Sheet 8
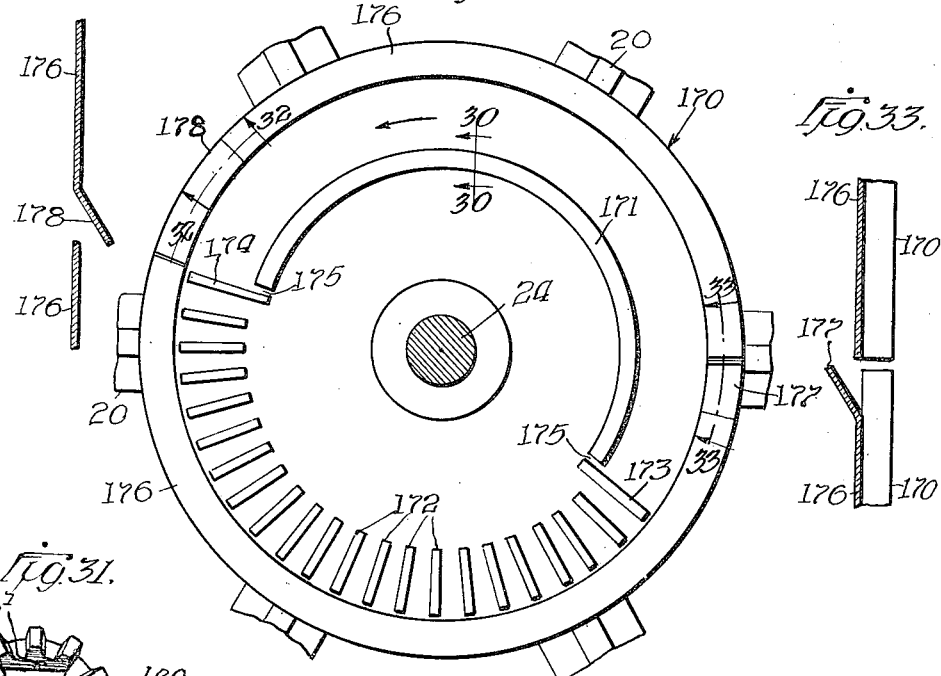
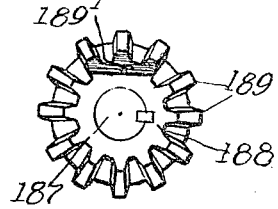
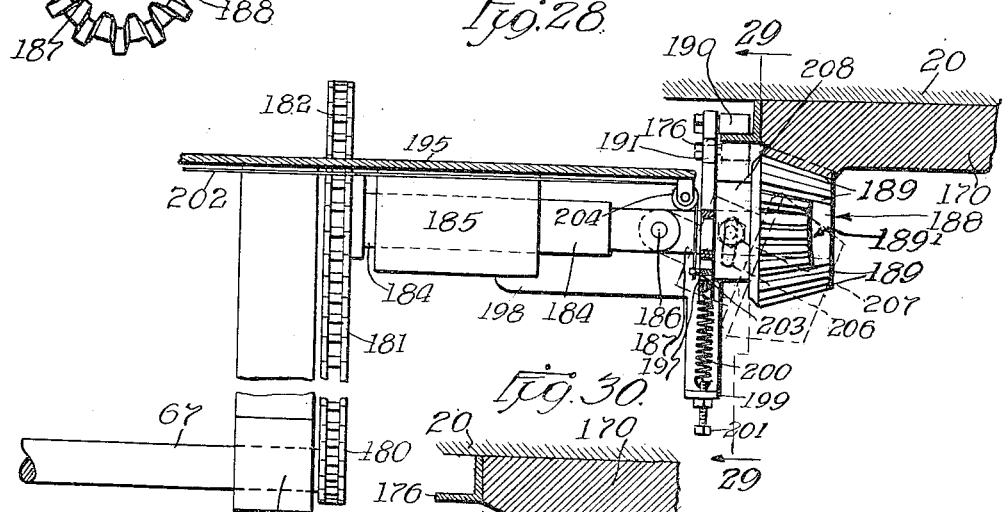
Witnesses
Harry R. L. White
Inventors
Harry B. Claar
Boyd C. Comer
By Arthur L. Sprinkle
Atty.

Patented Feb. 12, 1935

1,990,526

UNITED STATES PATENT OFFICE 1,990,526

BALING PRESS

Harry B. Claar, Watson, and Boyd C. Comer, Effingham, Ill.

Application September 21, 1931, Serial No. 563,917

20 Claims. (Cl. 100—20)

Our invention relates to baling presses and more particularly to improved automatic means for placing the binding wires around a compressed bale of loose, compressible material as hay, straw and the like and for automatically severing such binding wires and securing them in a binding position around the bale.

It is the primary object of our invention to provide improved economical and efficient means to render the operation of baling presses fully automatic in the operations of compressing, feeding the binding wires to overlapping position around the compressed bale and to twist the overlapping wires to connect or tie them into bale encircling bands, and then to sever the wires encircling the bale from the strands leading from the sources of wire supply.

It is a further object of our invention to provide an improved form of compression plunger for more efficient co-operation with the wire feeding, positioning and tying mechanism.

Another object of the invention is to provide improved timing mechanism capable of attachment to moving parts of standard baling presses for automatically controlling the movements of our improved wire positioning, tying and severing mechanisms.

Other objects of the invention will appear from the description in the following specification of the details of our improved bale tying apparatus with respect to the construction, combinations and arrangements of parts therein set forth, and depicted in the drawings forming a part thereof, the novel features being specifically defined in the appended claims.

In the said drawings:

Fig. 1 is a side elevation view of a commercial type of hay press upon which our invention is engrafted. In this view, certain of the details at the front or power applying end of the press are omitted to better disclose the details of the mechanism for operating our improved automatic bale tying mechanism, this view showing in side elevation one of a pair of large gears, power driven in the usual manner for operating the plunger for compressing the material in forming the bale. In this view, as in Figs. 2 and 3, while the feed hopper is shown, a part of the feeding mechanism is broken away as the same forms no part of the present invention.

Fig. 2 is a side elevation of the mechanism of Fig. 1 taken from the reverse side.

Fig. 3 is a vertical, longitudinal sectional view to disclose interior details of the mechanism shown in Figs. 1 and 2, this view in particular disclosing details of construction of the modified plunger which compresses the material in forming the bale, the plunger being specially constructed and adapted for co-operation with our automatic bale tying mechanism.

Fig. 4 is an enlarged broken, horizontal sectional view looking downwardly as indicated by the arrows, the view being taken on line 4—4 of Fig. 1 and disclosing important details of the improved plunger, compression chamber and automatically operated bale holding and binding wire tying and cutting mechanisms.

Fig. 5 is an enlarged vertical transverse sectional view taken on line 5—5 of Figs. 1 and 4 looking in the direction indicated by the arrows and illustrating important details of construction of our needles and needle operating mechanism for controlling the binding wire and presenting the same to the binding wire tying and severing means.

Fig. 6 is a broken view in side elevation of our improved wire guiding and tensioning means for releasing and withdrawing twisted and severed ends of the binding wires which remain upon the supply strands after the wires around each individual bale are tied or twisted and severed, and Fig. 7 is a longitudinal, sectional view through the mechanism of Fig. 6 taken on the line 7—7 of Fig. 6 looking in the direction indicated by the arrows.

Figs. 8, 9 and 10 are detailed, vertical, sectional views taken on the lines 8—8, 9—9 and 10—10 respectively of Fig. 6 looking in the respective directions indicated by the arrows and disclosing details of construction of the baling wire tensioning and withdrawing mechanism of Figs. 6 and 7.

Fig. 11 is a broken side elevation of a portion of the press appearing in elevation in Fig. 2 at the forward or hopper end of the bale compressing chamber and showing in greater detail portions of the especially designed bale holding dogs and mechanism for positively actuating same in holding the compression imparted to the bale by the compression plunger upon the withdrawal of the plunger to assist in holding the end of the bale adjacent the plunger upon the withdrawal thereof to prevent undue expansion of the bale while the binding wires are being applied, tied and severed.

Figs. 12 and 13 are vertical, detailed sectional views taken on line 12—12 and 13—13 respectively of Fig. 11 taken in the direction indicated by the arrows.

Fig. 14 is a top plan view of a portion of the frame adjacent to and disclosing the construction of a special eccentrically mounted tucker roller at the rear edge of the feed hopper opening into the baling chamber adjacent our improved automatic binding wire applying and severing and tying mechanism.

Fig. 15 is an enlarged view of the receiving guide sockets for the binding wire needles and the binding wire twisting and severing means.

Fig. 16 is an elevation view of the reverse side of the device appearing in Fig. 15, as taken on line 16—16 of Fig. 17.

Fig. 17 is a transverse sectional view of the device of Fig. 15 taken on line 17—17 looking in the direction indicated by the arrows.

Fig. 18 is a sectional view taken on the line 18—18 of Fig. 15 looking in the direction indicated by the arrows.

Fig. 19 is a sectional view taken on the line 19—19 of Fig. 17 showing details of mechanism for operating and controlling the wire twisting and severing means.

Fig. 20 is a detail longitudinal sectional view on line 20—20 of Fig. 15 showing other details of construction of the wire twisting and severing means.

Fig. 21 is an enlarged horizontal section on line 21—21 of either of the upper or lower twisting and severing mechanisms of Figs. 15, 16, 17, 18 and 20 respectively, showing the needles making the initial presentation and assembly of the baling wires just prior to the twisting and cutting operations.

Fig. 22 is a diagrammatic view showing the manner of the wire assembly as shown in Fig. 21 prior to the twisting and severing operations.

Fig. 23 is a sectional view similar to Fig. 21 showing the assembled wires after being twisted and just after the cutting operation.

Fig. 24 is a diagrammatic view of the binding wire similar to Fig. 22 showing the condition of the binding wires of Fig. 22 after being twisted, severed and after the operation of the spring tensioning and binding wire retracting device as shown in Fig. 6.

Fig. 25 is an enlarged broken sectional view taken on line 25—25 of Fig. 15 showing a detail of the special device for locking and releasing the binder wire twisting and cutting devices.

Fig. 26 is a section on line 26—26 of Fig. 25.

Fig. 27 is an enlarged elevation view of our special mutilated cam turning with and driven by a gear wheel on the main drive shaft and comprising gearing for operating and controlling the sequence of movements of the baling wire needles and mechanisms.

Fig. 28 is an enlarged detail sectional plan taken substantially horizontally and through the axis of the large cam gear shown in detail in Fig. 27 and with associated parts in plan and section showing the construction of the driving and tripping mechanism hand controlled in the form of the invention illustrated for intermittently operating at will the baling wire applying, twisting and severing mechanisms.

Fig. 29 is a detail vertical section on line 29—29 of Fig. 28.

Fig. 30 is an enlarged fragmentary section on line 30—30 of Fig. 27 looking in the direction indicated by the arrows showing further details of the gearing and cams for intermittently operating the wire applying and twisting and severing mechanisms.

Fig. 31 is an enlarged front elevation showing the details of construction of the special shifting mutilated gear for operating the baling wire applying, twisting and severing mechanisms.

Figs. 32 and 33 are enlarged broken sections showing details of construction of the mutilated driving cams, of the gear of Fig. 27, the views being taken on lines 32—32 and 33—33 of said Fig. 27 looking as indicated by the arrows.

Fig. 34 is a diagrammatic plan of one of the completed twisted and severed baling wire ties shown disassociated from the bale for illustrative purposes.

Figs. 35 and 36 are fragmentary end and side sectional detail views illustrating special features of construction of the compression plunger for novel co-operative relation with the baling wire applying, tying and severing mechanisms.

Our invention is embodied in a commercial type of power operated baling machine as illustrated in the drawings. Obviously it is not desired to be limited to any particular commercial type of power baler since the invention may be readily applied by certain modifications well within the skill of one ordinarily skilled in the art and the scope of our invention is to be defined only by the limitations imposed by the claims which are directed to the features of novelty which we have incorporated into the automatic bale tying press as herein described.

Referring more particularly to the drawings, Figs. 1 and 2 show the two longitudinal elevation views of each side of a commercial hay press to which our inventions and improvements are applied, while in Fig. 3 is shown a longitudinal, vertical section as described through the body of the machine, it being understood that in these views certain old and well known parts of the baling press are omitted for the purposes of clarity as, for example, the usual inter-connecting or power transmitting gearing for co-operating with the periphery of the piston and feeder operating and bale tying devices as shown in the drawings, as well as the usual supporting means as wheeled trucks or the like by which the press may be portably mounted, all of which details are omitted from the drawings, since they obviously form no part of the present invention.

Referring first generally to the features of the press herein illustrated and described as common and well known in the art, it will be seen that our invention is applied to a press frame in which the baling chamber is formed of longitudinally extending angle irons arranged with their outside angles forming the normal corners of the chamber. Such angle irons are designated by the reference characters 10, 11, 12 and 13 respectively and these main frame angles may be suitably supported in the usual manner by interconnecting braces of various constructions, some of which interconnecting members between the corner angles of the frame may be in the form of sheet metal as for example, within the baling chamber or a portion thereof to make of said chamber for co-operation with the compression plunger, a chamber substantially closed at its sides within the portion thereof where the materials being acted upon by the plunger are to be compressed. Since the construction of the main frame of the machine and many of the parts heretofore commonly found in such presses are old and well known in the art, brief reference will be made only to such portions of the machine, as are necessary to show one mode of application of our invention to baling presses. It is sufficient to say that the reference character 15 represents the usual hopper opening downwardly into the feed chamber through which the materials to be compressed are introduced in front of the plunger, which has certain special details of construction and is generally represented in the drawings, Figs. 3 and 4, by the reference character 16, this plunger being of the general reciprocating form adapted to engage each separate filling of loose material that is inserted into the receiving end of the baling chamber through the feed hopper 15.

The plunger 16 is connected by means of the cross pivot pin 17 with a pitman 18 or connecting rod having pivoted connection with a suitable gear driven wheel or wheels by which reciprocating movements in the usual manner are imparted to the compression plunger.

In the present embodiment of the invention, we show two mounted spaced apart companion gears, which are independently mounted upon separate shafts upon the frame of the machine and spaced apart just a sufficient distance to permit the pitman or connecting rod 18 to be pivotally connected by means of the cross pin 19 engaging the large companion gears, which are designated by the reference characters 20 and 21, the former being shown in elevation in Fig. 1 and the latter in elevation in Figs. 2 and 3 respectively.

Suitable mounting plates 22 and 23, Figs. 1 and 2, may be secured to the main frame angle members and carry stub shafts as designated by the reference character 24 for supporting these gears in spaced apart parallel relation on a common axis from the angle irons of the main frame.

The pitman or connecting rod 18 may carry a fixed plate or standard 25 to the top of which is pivotally connected a link 26 pivotally connected with a walking beam 27 which is pivotally connected at 28 to the top of a supporting standard 29 fixed to the main frame, the forward end of the walking beam 27 carrying the usual feeder device for inserting or pressing downwardly into the hopper of the baling chamber wisps or quantities of hay or other material fed to the machine.

A broken portion of such feeding mechanism is illustrated by the reference character 30, Fig. 3.

In the normal operation of a machine of this character as well understood, rotation will be imparted to the gears 20 and 21 and their synchronous rotation will carry through the pin connection 19, the free end of the pitman or connecting rod 18 in the path of a circle imparting the well known feeding movements to the compression plunger 16.

At the rear edge of the hopper 15 and at the rear edge of the opening leading to the feed chamber, we form a tucker roller which is designated by the reference character 35, the same being of a general tubular form being cut from a length of cylindrical tubing with a relatively large central opening loosely mounted upon a rod 40 supported in bearings at the opposite sides of the frame adjacent the feed opening, said bearings being of the form designated by the reference character 36 shown at one end of the roller 35 in Fig. 1, on the top of the frame of the press above the baling chamber.

As shown in Figs. 1 and 14, a pair of resilient spring members 37 of a flat elongated form are caused to extend with their free ends lying upon the top of the peripheral portion of the roller 35, thus tending at all times to force the roller toward the position where it will exert its maximum closing and tucking effect upon the material passing from the rearward end of the feed opening.

The special form of eccentric spring controlled tubular floating roller 35 serves as an efficient tucking device in conjunction with the hopper feeder member 30 and the compression plunger 16. It will be seen, particularly by reference to Fig. 3, that when the plunger forces a wisp or layer of hay or other compressible material upon a beat, as illustrated in Fig. 3, the effect of the roller 35 will be to tuck any projecting ends of the hay in each specific beat, downwardly upon the top of the plunger and to hold the same with elastic pressure downwardly so that upon each succeeding beat of the plunger, the material at the top of the beat will be folded over or tucked downwardly into position, thus insuring a finished bale at the top without any loose or projecting portions after the manner graphically illustrated in Fig. 3 as it will be seen that the eccentrically mounted roller 35 is capable of swinging upon shaft 40. When upward pressure comes upon the roller, upon each stroke of the plunger into the compression chamber, the roller may be forced upwardly by the pressure of the hay and its upward swinging movement will be resisted by the flexible flat springs 37 which are bolted at 38 to the top of the baling chamber, their free forward ends lying above and pressing downwardly upon the cylindrical surface of the roller 35 near the ends thereof.

In order to clarify the drawings, we have omitted depicting the usual gearing for imparting movement to the large companion plunger operating gears 20, 21 since the same forms no part of our invention, it being understood that any suitable gearing for transmitting power from a prime mover may be synchronously applied to the periphery of both these gears as by means of a shaft carrying spur gears meshing with the teeth of the gears 20, 21 for applying synchronous rotation thereto from the power source.

Generally speaking except for the combinative features of the improvements embraced in our invention, the foregoing description of baler parts, represents substantially one form of a class of common power balers well known in the art to which our improvements are readily adaptable, the same being the form of power baler to which we have elected in the present instance to apply our invention and improvement for automatic baling wire applying, tying and severing of the tied baling wire strands from the body or bodies of the wire supply.

The plunger of the press, designated generally by the reference character 16, while adapted to be reciprocated in the usual manner in the baling chamber and beneath the feed hopper will be of a special and novel construction the details of which are shown in Figs. 3, 4, 35, and 36 and from which it will be seen that we provide in the body of the plunger, a plurality of transverse slots designated by the reference character 50 (Figs. 3, 4, 35 and 36). These slots 50 correspond in number to the number of wire applying needles and consequently to the ultimate number of separate bands or tides of baling wire to be placed in position around each individual bale. In the embodiment shown in the drawings, the device is adapted to apply two spaced apart baling wire bands around each bale in the usual manner and consequently there are shown two of the slots 50 designed to accommodate the pair of spaced apart baling wire carrying needles which are duplicates of each other and both designated generally by the reference character 55 (Figs. 1, 4, 5, 21 and 23). The function of the needles 55 is to carry the baling wires across the baling chamber from side to side thereof after the bale is compressed so as to bring the baling wires together in parallel side by side relation in our improved wire tying, twisting and cutting mechanisms, and it is an important feature of our invention that we especially prepare the plunger 16 with the transverse needle slots 50 to receive the reciprocating needles 55 because in the cycle of operations of the mechanisms in compressing and tying the bale, it is desirable that provision be made to permit the needles to move transversely of the baling chamber so as to lay the binding wires across the chamber and at the extreme end of the compressed bale for tying while the plunger is in position to hold the bale under compression. The aforesaid slots in the plunger 16 as designated by the reference character 50, it will be seen from Fig. 3, are slightly contracted near the compression face of the plunger since it is obviously desirable that while the plunger is functioning, to compress the material of the bale, the whole of the compression face thereof or as much as possible should present an unbroken surface to the material being acted upon within the compression chamber.

In the detail views, Figs. 35 and 36, the separated portions of the plunger on the compression face, which serve to contract the entrance to the slot 50, are designated by the reference character 56, it being noted that there is a sufficient clearance between the ledges 56, partially closing the mouth of the slots 50 to permit the plunger to be withdrawn over the baling wires after the same have been threaded across the baling chamber by the transverse reciprocating movements of the needles.

A further novel feature of our design of modified plunger resides in the novel means we have provided for normally closing the entrance to the needle slots 50 in the plunger so that the plunger may function normally to present a substantially flat unbroken compressing surface to the materials being acted upon in the baling chamber. This consists of closure members 57, pivotally connected at 58 with an attaching member 59 which latter may be secured by screws as illustrated in Fig. 36 or by other suitable means to the compressing face of the plunger 16 in position so that the closure flap 57 will normally hang downwardly to close the entrance to the slot 50 but will operate on the hinge pin 58 to swing outwardly as illustrated by the dotted line in Fig. 36 to pass over the transversely fed baling wires in position within the chamber for permanent securement around the bale of compressible material.

In the construction of the plunger illustrated in Fig. 3 since two needles are employed and the plunger is provided with slots to accommodate each of them, there will obviously be one of the closure flaps 57 for each of the needle slots and in special cases where a greater number of baling wires are to be tied around each individual bale, the number of such closure flaps for the slots 50 will be increased according to the number of needles and corresponding slots employed.

The aforesaid spaced apart needles 55 will be mounted in parallel relation as illustrated most clearly in Fig. 5 and will be normally supported upon a special run way or frame attached to the outside of the longitudinal side of the baler frame, or as shown in Fig. 5, to the side of the chamber and frame supported by the longitudinally extending top and bottom angle irons 10, 11.

The reference characters 60 and 61 designate the laterally extending track members, suitably secured to the side wall adjacent the corner angles 10 and 11 of the baling chamber and these run ways at their outer extremities will be connected by suitable straps, as designated at 62, 63, Fig. 1. Since this laterally extending supporting framework for the reciprocating needles requires quite stable support, a truss rod 64 may be attached to the outer, upper corner of the frame and extend thence at a slight angle upwardly toward the top of the baling chamber.

The parallel needle bodies 55 will be merely extensions of a rectangular frame which will be provided as illustrated in Fig. 5 with interconnecting portions and certain cam tracks and gears by which construction the two needles are adapted to be synchronously reciprocated on the track carried by the parallel supporting frame members 60, 61. The supporting frame work providing the track for the needle carriage is provided with two substantially vertically arranged guide members 65, 66 that are spaced apart and provided with suitable cam surfaces hereinafter described to support the free end of the needle operating shaft designated by the reference character 67, the shaft 67 being provided near its outer free end with a spur gear 68 that is adapted to mesh with the teeth on the outer periphery of an irregularly shaped and especially constructed rack gear 69 (Figs. 4 and 5).

The extended needle members 55 may be cross connected by members 70, 71 to which the peripherally toothed rack gear 69 will be attached by suitable bolts 72, 73 with operating sleeves interposed as designated at 74 in Fig. 4.

The needle drive shaft 67 is connected for operation from one of the main operating gears which, in this embodiment of the invention, is designated by the reference character 20 as before described and this drive shaft 67 is so mounted and operated by mechanisms to be presently described that it is free to shift up and down at its outer end which carries the spur pinion 68 in engagement with the rack 69.

On the free end of the shaft 67 adjacent the needle mechanism and at the extremity beyond the gear 68 thereon there is a projection designated by the reference character 80 that may be in the form of a cylindrical trunnion or anti-friction roller which is adapted to project beyond the rack 69 and to contact in its travel around the toothed periphery of the rack 69 with certain guide surfaces hereinafter described as designated by the reference characters 88, 89 and 90.

The rack 69, it will be seen is substantially in the form of a rectangle having one corner thereof cut away as designated by the reference character 81, all of the outer five peripheral portions of the rack, designated by the reference characters 81 to 85 inclusive, being provided with teeth 86 adapted to be engaged by teeth on the spur pinion 68 on the floating drive shaft 67.

The vertical member 65 of the needle rack supporting frame is cut away so as to form a cam clearance as designated at 87, Fig. 5 to permit the shaft 67 to pass freely around the toothed end 85 of the needle rack 69 and to serve as a guide for the shaft.

The rotation of the spur gear 68, it will be seen, will have the effect of imparting a reciprocating motion to the needles 55 in a properly timed sequence because it will be seen that whenever rotation is applied to the gear 68 on the end of the floating drive shaft 67, if the shaft 67 and the gear 68 be rotated in the clockwise direction as the parts appear in Fig. 5, the rotation of the gear will cause it to travel downwardly in the slot between the members 65, 66 around the corner between the short toothed end 85 and the long side 84 of the needle rack member 69, and as the rotation of the gear continues it will be seen that the rack 69 will travel inwardly to the dotted line position shown in Fig. 5 carrying the needles 55 into the compression chamber and into the slots 50 within the plunger 16 and through the same into the wire twisting and cutting mechanisms on the opposite vertical side of the compression chamber as shown by the dotted line position of the needles 55 in Fig. 5.

When the needle rack member 69 reaches the innermost limit of its movement as shown by dotted lines in Fig. 5, the gear 68 on the drive shaft 67 confined always between the uprights 65 and 66 on the substantial supporting frame portion, will move around the corner between the toothed portions of the racks 84 and 83 being guided in this turning movement by reason of the fact that the projection or trunnion 80 will engage a corner cam track which may be formed integral with the top surface of the needle bar 55 as designated at 88, and as the rotation of the gear 68 continues, it will be seen that the confining effect of the track on the supporting frame will cause the gear 68 to rise to the top outer corner of the rack member 69 which will be a period of rest for the slidable needle rack 69 and the needles themselves.

When the gear reaches the top of the slot and the top of the rack, it will be guided around the corner by the camming action of the member 89 which, like the member 88, may be formed integrally on the needle bar.

This upward movement of the gear 68 has a further function in the tying operation while the needles dwell in relation to the wire cutting and twisting mechanisms that will be later described.

For the purpose of showing how the needles themselves are operated, it will suffice to say that after the drive shaft 67 has rotated until the gear 68 has reached the top of the toothed portion 82 of the rack, the gear 67 will be guided around the corner and the rack will be moved in the outward direction, thus retracting the needles and pulling them out of the slots in the plunger, the speed of the retraction being varied toward substantially the latter half of the retracting movement by reason of the engagement of the gear 68 with the inclined portion 81 of the rack.

The free end of the shaft 67 and the gear 68 thereon will be further guided so as to retain the proper meshing connection with the rack by reason of cam surfaces formed on the contiguous sides of the needle bars 55 and with a camming surface 90 which is parallel to the toothed rack portion 81 on the movable needle frame.

An important feature of our invention resides in the wire twisting and cutting devices that are secured on the reverse side of the compression chamber for co-operating with the wire carrying needle bars 55.

The construction of these bale wire twisting and severing mechanisms will be seen most clearly from an inspection of the drawings, Figs. 2, 4 and 15 to 26 inclusive.

*The bale wire twisting and cutting devices*

Since the embodiment of the invention shown employs a pair of needles for applying two binding wires around each compressed bale, we show a corresponding number of bale tying and wire severing devices, it being understood that the number of such devices will correspond to the number of needles used and the number of baling wires desired to be placed around each bale which is ordinarily two baling wires as commonly used in hay presses, although our invention is equally adapted to the actuation of a third needle and a third wire twisting and severing device.

On the side of the baling chamber opposite the side upon which the needle supporting frame is secured, we mount a vertically reciprocable rack bar 100 which is toothed as indicated at 101 and at its lower extremity it is connected with a transverse walking beam 102 pivotally mounted at 103 to a bracket 104 secured to the frame of the compression chamber of the baler.

A flexible connection between the walking beam 102 and the toothed rack bar 100 is obtained by means of a link 105 having pivotal connection at 106 with the rack and 107 with the walking beam.

In the embodiment of the invention shown, since the relation between the movements of the wire tying and cutting rack 100 and the needle actuating shaft 67 and the floating gear 68 thereon, are of the greatest importance in the successful operation of the machine, the beam 102 is shown as strengthened by the attachment of the adjustable truss rod 108.

An important feature of our invention also results from our improved mode of operating the wire tying and severing mechanisms from the needle actuating shaft 67 which is accomplished by connecting the free extremity of the walking beam 102 with a link 109 carried at its upper extremity by the floating shaft 67 which drives the needles. This connection is made by attaching a strap or other suitable form of bearing around the shaft 109 as indicated by the reference character 110. At the free extremity of the walking beam 102 for co-operating with the link 109, there is a perforation which receives the lower end of the link 109 and by means of a threaded nut or other fastening as indicated at 111, an upward pull on the link 109 will operate the walking beam and the wire tying and cutting rack 100 while the downward movement of the link 109 will not act positively upon the walking beam 102 but by reason of an interposed spring 112 there will be a certain amount of resilient control to insure proper return movement of the wire tying and cutting rack 100, in the upwardly or reverse direction as the wire tying and cutting devices are restored to their normal inoperative position.

The precise location of the bale wire tying and cutting device and the duplicate bale wires to be placed around the compressed bale, is best shown in the views in Figs. 1 and 2 showing the two longitudinal sides of the baling chamber in elevation.

Referring to the baling chamber end of the main frame at which end the completed bales are discharged as the rear end of the machine, it will be seen by referring to Figs. 1 and 2, as well as the sectional view in Fig. 3, that the bale wire tying and severing devices actuated by the vertical reciprocating rack member 100, are located at substantially the rear and beneath the feed hopper. The strands of baling wire will be rolled on suitable spools rotatably mounted on the two longitudinal sides of the baler frame. The spool designated by the reference character 115 carries the wire on the side of the frame from which the reciprocating needles 55 are supported and from which they enter the interior of the baling chamber to traverse the space within the baling chamber through the aforesaid slots 50 in the plunger 16 to carry each of the strands around the end of a completed bale next the plunger and through suitable openings in the baling chamber walls to a position where the wire strands of each of the baling wires are brought into parallel relation on that side of the baling chamber frame where the wire twisting and severing mechanism is located as shown in Fig. 2 and also shown in greater detail in the enlarged sectional view, Fig. 4.

Of the aforesaid wire spools 115 on the needle entering side of the chamber as shown more clearly in Fig. 4, there are two placed side by side upon the same spindle designated by the reference character 116 in Fig. 1. On the reverse or wire tying and severing side of the bale chamber frame there are two similar spools designated by the reference character 117. In this manner four separate strands of baling wire are used for feeding the requisite amount of baling wire into the baling chamber in order to operate the baler of the type to which the invention is shown applied wherein two separate loops or bands of baling wire are wrapped around each compressed bale longitudinally thereof in the usual manner.

The manner in which the wires are threaded into the baling chamber of the machine of the described character, is so well known as to need very little description and with the exception of the sectional view of the baler shown in Fig. 3, and some of the views showing the wires in connection with our improved wire twisting and tying and severing devices, we have not attempted to show the complete manner of threading the wire into the machine since this is well understood by those versed in the art of the old hand tying machines upon which our invention is engrafted. But it will suffice to say that the two strands of baling wire from the companion spools 115, designated by the reference characters 118, 119 are to be threaded as illustrated in Fig. 1 through suitable guides so that each of these wires will pass through slots or open seats formed in the forked or bifurcated forward extremities of the head portions 120 of the needles 55. These forked portions of the heads 120 of the needles 55 are designated by the reference character 121 in Figs. 4 and 5.

The aforesaid vertically reciprocating rack bar 100 in the embodiment of the invention shown, is toothed substantially throughout its length as designated by the reference character 101 to engage and operate the wire twisting or tying and severing devices in a manner to be presently described.

By an inspection of the sectional plan view of the baling chamber and the wire twisting or tying and severing devices as shown in Fig. 4, it will be seen that the baling wires 118, 119 on one side of the baling chamber pass through the retracted forked extremities 121 of the respective needles near the top and bottom of the baling chamber while the wire spools 117 take like strands of baling wire 122, 123 passing through special tensioning devices to be hereinafter described on the reverse side of the baling chamber and through each of the wire twisting, tying and severing devices to be operated in unison by the reciprocation of the toothed rack bar heretofore described.

Assuming that the baling chamber of the machine is empty and it is desired to start the operation of the machine, the two pairs of baling wire 118, 119, and 122 and 123 will be further threaded through suitable openings adjacent to and just to the rear of the plane of the needles 55 and both pairs of wires when the plunger 16 is retracted out of the baling chamber will be brought across the baling chamber in front of the effective compressing edge of the plunger 16 and they will be united in pairs, the wires near the top of the chamber being united together by a suitable hand twisting operation in starting the machine while the corresponding pair of wires entering the chamber from the opposite side thereof near the bottom and in the plane of the lower needle, will likewise be brought together and secured in the same manner. The wire thus treated puts the machine, as illustrated in the drawings, in condition for operation and this will precede the starting of the motor power and actuating the compressing plunger 16 to compress the first bale in the usual manner in this type of machine by feeding the material into the hopper 16 where it will be pressed downwardly by the reciprocating feeder device 30 whereupon each successive wisp or beat, the hay or other material will be compressed by the plunger 16 into the forward or feeding end of the baling chamber, any ragged or projecting edges of each beat at the top of the chamber being tucked down by the co-operation of the tucker roller 35 in the manner heretofore described and illustrated in Fig. 3.

This operation of feeding the material into the machine will in the usual manner be continued until a proper amount of material has accumulated and been beaten and compressed into the chamber by the plunger 16 to form a bale. In the formation of the first bale, upon starting the machine, any suitable means may be temporarily employed to assist in frictionally holding the hay forced into the chamber by the beater since after the formation of the first bale, it will be understood that each bale, upon being tied will still remain in the baling chamber until it is pushed therefrom by the feeding action of the plunger in forming a subsequent bale, such pressure being set up in a common manner by means of spring holding devices designated by the reference character 124, Figs. 1, 2 and 3 at the outer or discharge end of the baling chamber.

In our embodiment of the invention, as illustrated in the drawings, the operation of the press is not shown as wholly automatic but the special gear and driving mechanism for operating the shaft 67 which actuates the needles and the baling wire tying and severing devices is arranged to be inactive while the bale is being formed and whenever a sufficient amount of material has been beaten into the chamber, by the plunger 16, to form a bale of the desired size, the suitable clutching mechanism to be hereinafter described as operated from the main drive gear 20, will be actuated through the hand lever 125, Fig. 1, whereupon the needle and tier drive shaft 67 will be rotated and the needles 55 carrying the upper and lower baling wire strands 118, 119 will be carried by the forked extremities 121 of the needles into the baling chamber through the respective transverse slots 50, as the movement of the plunger will be timed for this purpose, whereupon quick movements of the needles will carry both of the wires 118, 119 entirely across the baling chamber from the needle entering side thereof to the wire twisting and severing mechanism on the opposite outer wall of the baling chamber where the companion strands 122, 123 are threaded into the wire tying and severing devices.

This will result in causing each of the two baling wire bands to completely encircle the bale, the bands being formed by the before described initial union of them in starting the machine and the last described traversing action of the needles 55 will have the effect of carrying both of the baling wire strands 118, 119 bodily through the slots 50 of the plunger whereupon the tension of the wires 118, 119 as they pass through the restricted outer opening of the slots 50 between the ledges 56 will contact with the hinge closure flaps 57, before described, raising them so as to permit the wire strands 118 to be wrapped around the end of the completed bale next the plunger, and the needles will thus lay the upper and lower co-operating pairs of strands 118, 119, 122 and 123 in close parallel relation so that they contact with each other within the wire twisting, tying and severing devices in condition for the action of those instrumentalities to complete the bale and thus put it in condition to be discharged as a finished bale from the baling chamber.

As the needles 50 carry the strands 118, 119 of wire across the chamber, these wires are not only looped around the trailing end of the completed bale but they are also brought together around the compressing end of the plunger upon its withdrawal and tied in such a manner that after the completed bale is severed, the two pairs of wires on opposite sides of the chamber are united and in condition to receive the material for the succeeding bale to be fed upon these wires by the plunger.

In Fig. 22 we show the manner in which the baling wires are assembled within each of the wire twisting or tying and severing devices and from which it will be seen the forked or slotted spaced needle projections 121 will crowd and carry, for example, the strand 118 across the chamber to the tying and severing mechanism and lay a portion of the wire 118 adjacent to and parallel with the strand 122, the two to be twisted or tied together and then both transversely severed to the form illustrated in Fig. 24 by our improved mechanism operated by the vertically reciprocable rack bar 100 as will now be more specifically described.

The rack bar 100 is supported for vertical reciprocation on the lateral vertical outer wall 126 of the baling chamber which is opposite the wall 127 there being an opening in the opposite wall 127 through which the needle enters the chamber from the opposite side to pass through the openings 50 in the plunger. The bar 100 is provided with longitudinal grooves 128 on the opposite sides thereof (Figs. 18 to 23 inclusive) by which it is slidable on the vertical guide plates 129 secured by bolts 130 to a supporting frame comprising in the embodiment shown, two parallel spaced apart bars 131 which constitute the chief frame support for the wire tying and severing devices. (Figs. 16 to 19 inclusive.) These bars for convenience in assembling are held together in proper parallel spaced relation by tubular spacers 132 surrounding threaded locking bolts 133 and for securing the device on the side of the baling chamber, each of the bars 131 at their respective ends, are provided with attached, perforated ears 134 by which they are attached to the side of the baling chamber, preferably to the corner angle irons 12 and 13 by bolts 135.

Near the extremities of bars 131 they are each provided with registering perforations that lie in the planes of the needles 55, and the wire twisting or tying and severing devices are rotatably mounted therein so as to be actuated by the reciprocations of rack bars 100. These consist of two telescoping tubular members, the details of which are shown most clearly in Figs. 17, 18 and 20 to 23 inclusive, and these tubular members have formed integrally therewith peripheral actuating wheels or gears. The reference character 135 designates one of them and 136 is the other.

Integrally formed with 135 is a disk 150 of circular form adapted to lie between the bars 131 while an extension on 135 on the inner end thereof rotates within the tubular member 136 which has the adjacent toothed gear 137 formed integrally thereon in mesh with and driven by rack bar 100.

The co-operating ends of the wire tying and severing members 135, 136 are provided with integral closure members 138, 139 respectively, and the material of these members is radially slotted, the slots extending to the center as indicated at 140, 141 as shown most clearly in Figs. 21 and 23. The slot 141 is extended radially also to the outer periphery of the gear 137 entering the gear as shown most clearly in Figs. 17 and 21 between two of the gear teeth. The bars 131 are also provided with outwardly flaring communicating slots 142 which permits the two spaced apart forked branches 121 of the needles 55 to pass upon the opposite sides of the wire tying and severing mechanisms to lay the co-operating strand portions of each bale side by side in parallel relation as indicated by the reference characters relating to the wires, particularly in Fig. 21 in which the wire on the tier side is designated as in Figs. 22 and 24 by the reference character 122 while the wire which is carried across the baling chamber by the needle 55 is designated at 118. Suitably secured on the sides of the frame bars 131 are the needle guide sockets which flare inwardly toward the baling chamber and are indicated by the reference character 152. Thus it will be seen that with the disc 150, also peripherally slotted to the center thereof, as indicated at 143 and this slot is also extended to the end of the tubular member 135, merging with the aforesaid slot 141 therein, the wire twisting or tying and severing device connected with the tubes 135, 136 rotatable from the rack bar 100, when placed in their respective positions as in Fig. 21, will permit the forked extremities 121 of the needle 55 upon entering the sockets 152 to lay the wire strand from the opposite side of the bale around the rear end of the bale and over the front of the retracted plunger into the position of the wire 118 shown in Fig. 21, it being observed that the walls of the sockets 152 are also slotted as indicated at 144, Fig. 20.

The manner of threading the wires 122, 123 from their spools 117 through the wire tensioning and retracting device has been heretofore described and it will be seen that the wires 122, 123 will be threaded through the tying and severing mechanisms in the manner illustrated in Fig. 21, passing out of the same to a position around the bale being formed by the beats of the plunger.

To understand fully the mode of operation of our improved wire tying or twisting and severing device, it should be first pointed out that the closed ends 138, 139 of the rotatable tubular portions 135 and 136 adjacent the slots 140, 141 therein should be formed along their contiguous edges with sharp tempered cutting angles 300, 301 (Figs. 21 and 23) to provide a shearing action upon the baling wires 118, 122 held therein ready for the twisting or tying and severing operations as illustrated in Fig. 21.

When the baling wires are in the position of the parts shown in Figs. 20, 21, it being understood that the wires 122, 123 on the tier side of the chamber will lie within the registering slots of the tying or twisting and severing device, while the plunger is working to beat the bale and as the bale is formed, the pressure on the wires 122, 123 looped around the discharge end of the bale, will pull through the slotted portions of the wire tying and severing device such quantities of wire as may be needed. The same thing will likewise be true of the wires 118, 119 on the needle side of the baling chamber while the bale is being formed. After the bale is formed, through suitable tripping mechanisms to be hereinafter described, the operator may set the needle actuating shaft 67 into operation which will bring the needles 55, to a point adjacent the wire tying and severing mechanism as illustrated in Figs. 21 and 22, whereupon a further movement of the needle actuating mechanism in a manner to be hereinafter described, will cause the rack bar 100 to start from its normal upwardly stationary position, as shown in Fig. 20, and to move downwardly. This will rotate the gears 137 and the presence of the parallel wire strands 122 and 118 then in the slots of the wire tying and severing device will result in the wires being twisted in the manner illustrated in Fig. 23 to form a tie, this twisting action, as shown most clearly in Fig. 23, being due to the fact that the slots 140, 141 are only wide enough at the bottom to permit the passage of one of the wires at a time toward the bottom of the slot with the result that when the gear 137 is rotated, with its slotted sleeve 136 and when the sleeve 135 is free to rotate with the gear 137, the twists in the wires 118 and 122, as indicated in Figs. 23 and 24, will be produced.

When the rack bar 100 has moved from its normal elevated position, as illustrated for example in Fig. 20, to near its lowermost position as indicated by dotted line position of the block 145 on the bar 100, the wires being twisted in the manner illustrated in Fig. 23, the bevelled block 145 riding underneath the angular overlapping extremities of the levers 146, 147, as indicated at 320, 321 will result in bringing the opposite ends of these levers provided with the respective pawls 148, 149 into engagement with a shoulder 151 formed in the periphery of the before described discs 150, thus locking the discs 150 and the sleeve 135, which is integral therewith so that continued rotation of the gear 100 will cause a shearing action between the cutting edges of the closure parts 138, 139 adjacent the bottoms of the slots 140, 141 which will result in cutting of the dual twisted strands as illustrated in Figs. 23 and 24.

For positioning the slotted disc 150 and the tubular hub portion 135 thereof with its cutter to insure proper stoppage thereof to insure that the slots in the respective tubular twisting and cutting members 135, 136 shall register when the bale tie wires have been cut upon the resumption of the plunger beats to form a succeeding bale, we provide a special device consisting of a spring pressed locking plunger 160, Figs. 21 and 23, having an offset portion forming a shoulder 161 that is adapted to engage a slot 162 in the end of the member 135. The outer end of the reciprocating member 160 is angularly turned and a spring of the compression type, 163 is inserted therebetween and a seat upon a bracket 164 secured to the bar 131 to overlie the slot receiving the plunger 160. The forward end of the plunger 160 which is offset as indicated at 165 is caused to project to and beyond the center of the opening in the tubular cutter and twister 135, the length of this projection to be such that when the baling wires are pulled taut through the cutting and twisting device as indicated in Figs. 21 and 23, the locking shoulder 161 and the plunger by which it is carried will be forced outwardly against the action of spring 163 to free the cutting and twisting member 135 which carries the disc 150, but when the wires are cut as appears in Figs. 23 and 24 and the tied portions of the wires around the completed bale are pulled out of the tying and severing device the pressure of the wires being temporarily removed from contact with the end 165 of the spring locking plunger will cause the spring 163 urging it toward the center of the tube 135 to enter the slot 162 whenever the slot passes beneath the plunger and the locking shoulder 161 thereon, which insures the proper setting and locking of the cutting and twisting tube 135 and disc 150.

*The timing and driving mechanisms for operating the baling wire twisting and cutting devices*

Since our baling wire tying and severing mechanisms must synchronize in their movements with the movements of the slotted plunger through which the needles pass in the bale tying operation we have devised improved means for timing and driving the wire tying and cutting devices which insures perfect cooperation between the bale forming beats of the plunger and the feeding mechanism which has enabled us to produce an automatic bale tier that is efficient, and at a cost to manufacture that has rendered the device capable of wide general use in supplanting baling presses as formerly equipped with only the old hand tying devices for applying and securing the baling wires around the compressed bales.

We secure to the large spur driving gear 20 or to its shaft 24 so as to rotate therewith a specially constructed mutilated cam-gear which is shown in detail in the elevation view of the same in Fig. 27, other details of the same appearing in Figs. 28 to 33 inclusive. This special mutilated cam-gear is designated generally by the reference character 170 and it may be secured on the shaft 24 to rotate with the driving gear 20 in any suitable manner, not shown, or if desired it may be constructed as an integral part of the gear 20. The function of the mutilated cam-gear 170 is to impart rotation at timed intervals to the aforesaid shaft 67 operating the baling wire tying and severing devices. At the forward end or adjacent the driving gears 20, 21 the shaft 67 is provided with a sprocket 180 which takes a chain 181 to a sprocket 182. The adjacent end of the shaft 67 is rotatably mounted in a bearing 183 suitably secured on the side of the main frame. The sprocket 182 is secured to one end of a shaft 184 which is rotatably mounted in an elongated bearing support 185 so that the short shaft 184 is extended to a point adjacent the periphery of mutilated cam-gear 170 and it has pivotally connected therewith at 186 by a hingelike connection a short shaft 187 which has secured to its free end a specially constructed bevelled driving pinion 188 in the manner shown most clearly in Figs. 1, 28, 30 and 31. In Fig. 28 we show by dotted line position the manner in which the driving gear 188 moves toward and from the driving surfaces of the mutilated cam-gear 170 and from which it will be seen that when the gear 188 is in mesh with the cam-gear 170, rotation will be imparted to the needle and tier operating shaft 67 through the short floating shaft 187 which carries the gear 188, and through the shaft 184 and the chain 181 with the sprocket gears before described. The spur gear 188 is provided with the usual teeth 189, but, as illustrated in Figs. 28, 30 and 31, a portion of the teeth are cut away to form a slot as designated by the reference character 189', which latter is designed to co-operate with the cam track 171 on the face of the cam-gear 170. The cam-gear 170 is provided with a plurality of teeth 172 for engagement with the teeth of the floating spur gear 188, and the details of the construction of the same will appear most clearly from the sectional view of Fig. 30.

At the extremities of the gear teeth 172 we provide the teeth 173, 174 which are longer than the teeth 172 and extend radially and inwardly to a point adjacent the extremities of the cam track 171, there being depressions 175 between the teeth 173, 174 and the extremities of the cam track 171. At the outer periphery the cam-gear 170 is provided with another cam track 176 which presents a relatively peripheral cam member to an anti-friction roller 190 that is mounted on a shifter device 191 for operating the tooth gear 188 to and from engagement with the mutilated cam gear 170.

The peripheral, thin cam plate 176 extends substantially all the way around the cam-gear 170 but it is broken at two portions of its periphery as indicated at 177 and 178 respectively and the parts designated by 177 and 178 are deflected out of the common plane of the thin cam portion 176 as shown most clearly in Figs. 27, 32 and 33 to permit the roller 190 to traverse certain defined paths during the rotation of the mutilated cam-gear 170 on alternate sides of the thin peripheral cam portion 176 as will be hereinafter described.

The shifter fork 191 carrying the roller 190 is pivotally mounted at 192 upon a bracket 193 (Fig. 29) which is secured upon the side of the main frame of the press upon the angle bar 10 connected in part to the main frame by a substantially vertical brace-bar or plate 195 which has a bracket thereon for the pivotal connection at 196 of the pivotally mounted depending arm 197 that bears against one of the forked branches of the shifter fork 191.

198 is a bracket plate secured to the lower frame angle bar 11. This plate 198 is of special form containing at its outer projecting extremity of vertical portion 199 to which is connected on end of a tension spring 200 by an adjustable screw connection 201 while the other end of the spring is connected to the outer free end of the shifter fork 191 which is engaged by the swinging lower extremity of the pivotal control member 197.

A trip cord 202 is attached to the swingable arm 197 at 203 (Fig. 29) and passes around a deflecting sheave 204 (Fig. 28) and extends thence longitudinally past the feed hopper to a point adjacent the baling chamber where it may be connected to the before described pivoted trip lever 125 as indicated at 205 (Fig. 1).

The aforesaid bracket plate 198 is slotted with an arcuate slot 206 (Figs. 28 and 29) which takes a downwardly projecting guide plug or screw body 207 threaded in a slidable bearing block 208 in which the aforesaid pivoted shaft 187, carrying the bevelled pinion 188, is journalled.

The machine screw 207, as shown in Fig. 29, is provided with a substantial head below the lot in guide plate 198 thus furnishing a substantial guide for the shiftable bearing 208 whereby to control the connecting and disconnecting oscillations of the bevel driving pinion 188 on the pivotal connection 186 between the shaft segments 187 and 184.

One end of a second tension spring 209 (Figs. 28 and 29) is adjustably connected to the vertical part 199 of the bracket 210 and at its other extremity to the gear shift or bearing block 208 which is also positioned between the arms of the shifter fork 191 as aforesaid, thus normally tending to hold the bearing block 208 and the bevel drive gear 188 out of mesh with the mutilated cam gear 170 during the normal operation of the compressing plunger 16 while the bales are being formed and compressed to get them in condition for the baling wire inserting, tying and severing operations.

As appears from the drawings, the tension spring 209 will be made of heavier spring wire than the spring 200 since the former must be strong enough for shifting the bevel driving gear 188 out of mesh with the mutilated driving gear 170 whereas the function of the spring 200 is only to act upon the comparatively light shifter fork 191 to normally tend to hold it in the disconnected position from the peripheral cam plate 176 while the plunger is normally operating in feeding and compressing the material being baled from below the orifice in the feed hopper into the baling chamber.

*The mode of operation of the baling wire tying and severing actuating devices*

From the preceding description, it will be understood that the plunger 16 will be operated through the pitman 18 by the rotation of the companion gears 20, 21 and, during the feeding and compressing until the bale is formed ready for tying, the tier actuating shaft 67 will be at rest with the tier actuating rack bar 100 at the upper limits of its movement and the tier driving gear 188 will be in the dotted line position out of mesh with the cam-gear 170 as illustrated by the dotted line position in Fig. 28, the guiding roller 190 on the shifter fork 191 riding on the outside of the cam surface 176. Assuming that the gears 20, 21 are in continuous rotation a pull upon the lever 125 through the trip cord 202 against the action of spring 200 will oscillate the shifter fork 191 to bring the roller into contact with the adjacent outer face of the peripheral cam portion 176. Thus the tripping of the lever 125 may take place at any instant desired by the operator regardless of the position of the mutilated cam driving member and gear 170 and the only immediate effect of the tripping action will be to shift the fork 191 inwardly to cause the roller 190 to ride the outer face of the cam track 176 until the same rotates to bring the cam 176 to position where the roller may follow the inwardly deflected portion 177 of the cam track whereupon the roller 190 will pass through the gap to the opposite or inner side of the cam track 176 which is the position of the parts shown in Fig. 29. This will result in the sliding inwardly of the driving gear 188 which will by reason of the arrangement of the pivotal connection 186 on its operating shaft have been lying at rest in a position so that when the gear 188 approaches the mutilated cam gear 170 the aforesaid slotted portion 189' of the gear will contact and slide over the cam track 171 so that as the gear 188 comes into mesh it will properly register by first having one of its teeth register with the slot 175 at the entry end of the gear segment adjacent the long tooth 173 which properly positions the gear for meshing with the remainder of the teeth 172 of the series. The continued rotation of the mutilated cam gear in the direction indicated by the arrow in Fig. 27 will rotate the tier shaft 67 and start the before described inward movement of the wire carrying needles the device being so timed that the plunger 16 with the needle slots 50 therein will be at the compressing end of the stroke so that the baling wire strands 118 and 119 on the side of the baling chamber from which the needles enter will be carried by the slotted needles in the manner heretofore described to the dotted line position of the needles 55 as shown in Fig. 4 bringing the strands 118, 119 into parallel position in the manner heretofore described within the wire tier devices. The number of teeth 172 in the tooth segment of the cam gear 170 will rotate the drive shaft 67 a complete cycle of movement as heretofore described so that the drive pinion 68 meshing with the needle rack gear portions will first quickly travel to the dotted line position of the rack as shown in Fig. 5 during which time the wire tying and cutting devices will be inactive, but when the rack carrying the needles has been driven to the inward limits of its movement the shaft 67 contacting with the cam portion 88 on the needle frame will round the outer lower corner of the rack and start in its upward travel in the slot of the needle rack frame between the guide bars 65, 66 of the frame with the result that the pitman 109 will oscillate the walking beam 102 and start the downward movement of the tier and cutting actuating rack 100 first twisting the wires within the tier and cutting mechanism in the manner illustrated most clearly in Fig. 23, and when the cam block 145 on the rack 100 nears the downward limit of its movement passing under the deflected ends 320, 321 of the pivoted levers 146, 147 the pawl portions 148, 149 thereon will lock the discs 150 and the cutting portions 138 thereto attached whereupon the further downward movement of the rack 100 will carry the companion section 139 in a further turning movement so that the sharp and shearing edges 300, 301 of the companion slots 140, 141 will shear the two twisted strands of the baling wire. Following the twisting operation the needles 55 will be withdrawn by the before described operation of the needle rack mechanism causing the rack to be driven outwardly freeing the needles from the chamber. When the needle rack driving gear 67 has passed over the top sections 82 and 81 of the rack, the gear 67 being always confined to a substantially vertical reciprocation, the final downward movements of the gear 67 over segments 81 and 85 of the rack will restore the rack bar 100 to its elevated position, at which time the slots 140 and 141 in the tying and cutting mechanisms will be brought into registering positions as illustrated in Fig. 21 and the slotted plunger 16 will have been carried by the pitman 18 away from the tying position causing the united ends of the upper and lower pairs of baling wires 118, 122 and 119, 123 to be freed by the withdrawal of the plunger due to the lifting of the hinged flaps 57 on the compression face of the plunger. After the wires 122, 123 as twisted in the tier device have been cut the return movement to the elevated position of rack 100 in the manner described might result in reversely rotating the cut and twisted ends of the wires 118, 122 as they appear in Fig. 23 and so destroy the union desired for encompassing the outer end of the succeeding bales. This is avoided by the provision of a special wire tensioning and withdrawing device adjacent the tying and cutting mechanisms as illustrated most clearly in Figs. 2, 4 and 6 to 10 inclusive.

This wire tensioning and withdrawing device of which one is provided for each baling wire on the tier side of the machine comprises a slotted strip 220 which has angular terminal extensions 221, 222 that are slotted to take the wires passing from the spools 117 into each of the tier devices, such slots being designate at 223, 224. The wires 122, 123 are passed between two spring pressed plates, one of which is designated at 225 and secured to the sliding body of the member 220 while the other 226 is mounted upon two or more spaced apart pins 227 and resiliently pressed toward the plate 225 by means of compression springs 228. This tensioning and withdrawing device is slotted at 229 to receive the bolts 230 on the chamber plate 126 and a strong spring of the tension type 231 is attached at the lower outer corner of the deflected portion 221 as illustrated in Figs. 6 and 8. The other end of the spring 231 is secured to the chamber plate as indicated at 232, Fig. 6, thus tending to exert a resilient pulling action on the tensioning device in the direction of the wire spools 117 which pulling action will be overcome by the normal pull of the wire from the baling chamber upon the successive beats of the plunger so that when the bale is completely formed and the wires in position to be tied and cut the device will be held at the forward limit of its reciprocation under tension of the elongated spring 231 in the manner illustrated in Fig. 6 in which we have illustrated the condition of the baling wire in the tier. Upon the severing or shearing action of the tier and cutting devices the pull on the baling wires will be released and the spring 231 will instantly cause the tensioning device to snap backwardly toward the spools carrying the wire supply with the result that the slots of the tier will be freed instantly upon the severing action of the cutters from the wire strands held in the slots during the twisting operation for not only will the tied extremities of the wire on the spool side of the device be snapped out of the slots of the tier but the elastic condition of the tied bale will also instantly snap the severed ends of the wire on that side out of the tier, all of which it will be seen will result in freeing the tying mechanism of the projecting ends of the severed wires almost instantly upon the cutting action following the making of the tie or twist with the result that the tying devices under the control of the rack 100 may be reversely rotated when the rack is again moved to the upper limit of its movement to put it in position for the succeeding bale tying operation, otherwise if the severed ends of the twisted wires, especially on the supply side of the tier, should remain in the twisting slots of the tier this necessary reversing action would destroy the tie and cause a failure to tie the succeeding bale.

The bale holding dogs

As the wisps or layers of material are fed by the plunger 16 and compressed in the baling chamber as indicated by reference character 240

(Fig. 3) upon each withdrawal of the plunger 16 it is desirable to employ means in a press of this character to hold the compressed material while the plunger is undergoing retraction for each succeeding feed stroke. We employ specially constructed dogs or bale-gripping devices for this purpose mounted upon the sides of the baling chamber and having bale engaging or gripping parts that are arranged to cooperate with the plunger and to enter the chamber upon the withdrawal of the plunger upon each successive beat to hold the material in the chamber in its compressed condition. These devices have been specially devised and constructed by us and consist of two different forms of such devices, one of which is mounted upon the outside of the baling chamber wall just beyond the plane of movement of the needles and in proper position to enter the compression chamber to block the expansion of the forming end of the bale upon each withdrawal stroke of the plunger.

On the side of the baling chamber from which the needles 55 enter we show one form of such dogs (see Figs. 1 and 4). Two of these dogs are shown each being mounted in substantially the plane of reciprocation of the tier needles 55 to cooperate with the baling material in substantially the planes where the baling wires will be attached to the completed bales. Arms 240 are pivotally connected at 241 to a bracket 242 on the outside of the chamber. To the forward extremities of the arms 240 we attach bevelled heads as designated by the reference character 243, Fig. 4. Each of the heads 243 are constructed of two plates spaced apart a sufficient distance so as not to interfere with the wires 18 and 19 as they pass from the spools 115 into the chamber and around the material undergoing compression in the chamber. The sides of the chamber are cut away to permit the entry into the chamber of inward projections 244 of these dog heads. The points of the heads are bevelled as illustrated most clearly in the plan view of the same, Fig. 4. The bevel on the inside as indicated at 245 being adapted to cooperate with beats of the material being compressed and forced rearwardly by the compressing face of the plunger whereby the inwardly projecting portions 244 of the heads 243 will be held inwardly with resilient pressure from a flat spring 246 to which is attached an elongated yoke 247, the ends of which overlie the arms 240. In order that the dog heads 243 may not interfere with the normal compressing stroke of the plunger the compressing face of the plunger at the corner which would first contact therewith is notched or cut away as indicated at 248 to provide a clearance for the dog heads 243. In Fig. 4 we show the balings wires 118, 119 passing between the spaced plates making up the spring pressed dog head 243. At the opposite side of the baling chamber while a similar problem is presented in holding the compressed material upon the withdrawal of the plunger the proximity of the tying mechanism and bale wire cutting devices requires the use of special dog heads which we have provided as an important part of our invention. These are mounted upon the free extremities of pivoted arms 260 secured like the arms 240 to bracket bar 261, the pivotal connections being indicated at 262, the bracket 261 being bolted to the side wall of the baling chamber. 263 is a flat spring secured to the bar 261 and at its free end carrying a cross-bar 266 the off-set extremities of which overlie the arms 260. These arms carry inwardly extending hooked projections designated by the reference character 264 making a form of dog head quite thin for cooperation with the wires and wire tying devices on the adjacent side of the chamber and in the hooked inwardly extending portions 264 are provided V-shaped notches or slots as indicated at 265 which permits the baling wire strands 122,123 to clear these dogs. The adjacent vertical corner of the plunger head 16 is cut away like the other corner as described at 248 to enable the plunger on its compression stroke to clear the dog heads 264. The space permissible for the heads 264 and the character of the dog employed in this location will not permit of the use of an angular face whereby the dog may be actuated in the outward direction by the pressure of the material under control from the plunger as in the case of the bale holding dogs 243 on the opposite side of the chamber. Provision for positive operation of the spring controlled dog arms 260 is therefore made in the nature of a cam plate 270 which is pivoted in a bearing 271 at its upper end where it is provided with a trunnion 272. The lower end of the cam plate 270 is provided with an elongated cranked extension 273 pivotally mounted on the lower side of the chamber frame at 274, there being a reciprocating rod or pitman 275 connected to the crank pin 276 of the cam plate crankshaft (Figs. 11 and 2). The connecting rod or pitman 275 is extended to a point adjacent one of the large drive gears on the same side of the main frame which is the gear 21 and it is pivotally connected at 277 to a link 278 pivotally supported at 279 on the under side of the main frame bar 13. The gear 21 carries a projecting cam segment 280 and there is an inwardly projecting pin on the center of the pivotal connection 277 which is normally in the path of the abutting forward end of the cam 280. Therefore on each beat of the plunger which will be controlled by the rotations of the gear 21 and the pitman 18 carried thereby the cam 280 moving in the direction indicated by the arrow in Fig. 2 will oscillate the link 278 and the rod 275 causing the cam plate 264 to rotate and to force the dogs 264 to the outside of the baling chamber clear of the plunger and to be held in that position while the plunger is on the compressing end of its beat by reason of the fact that the pin 277 will ride for a time on the upper side of the cam 280 but when the cam traverses its length beneath the inwardly projecting pin 277 the link 278 with the elongated pitman 275 will be released and the cam plate will return under the resilient action of the spring 263 to bring the dogs 264 back into the operative full line position as illustrated in Fig. 4. Thus it will be seen that the positively actuated dog heads 264 and the resiliently actuated heads 243 will function in gripping the baling material after each compression stroke of the plunger to hold the same while the plunger withdraws and traverses the feed opening below the hopper on the succeeding beat while the dog heads 264 will be positively withdrawn as described on each compression beat.

From the foregoing description of our improved baling press it will be seen that we have provided mechanism capable of substantially continuous operation after being once put in operation with suitable power applied to operate the driving gears 20, 21. It will of course be apparent, as is usually the case, that with this type of press some precaution must be taken to set up the initial pressure in the baling chamber necessary to get the requisite compression in forming the first bale. In the view, for example Fig. 3, we show a completed bale which is designated by the reference character 400, the same having wires 118, 119 in position there around. The manner in which the succeeding beats of compressible material is forced against the end of the finished bale 400 is also indicated at 410, Fig. 3, and the projecting inner ends of the positively actuated dogs 264 are shown in the sectional view Fig. 4, these dogs as heretofore explained, serving to hold the beats of compressible material after each release by the plunger 16. It will be seen that if the spools 115, 117 are kept supplied with wire with press in operation it will be only necessary for an attendant to feed the compressible material into the hopper 15, and in the embodiment of the automatic tie and severing mechanism shown, to watch the formation of the beaten material into each bale so that when the baling chamber contains the requisite amount of compressed material the operator may set the baling, tying and severing mechanism in motion by actuating the trip lever 125, in the manner described. After tripping and actuating the lever 125 to bring the driving pinion 188 into contact and subsequent mesh with the mutilated cam driving gear 170, it will be seen that the baling wires will be applied in position and tied and severed and all of the mechanism returned to normal position ready for the formation and subsequent tying of a succeeding bale, the formation of which, acting upon the completed bale or bales 400 in the discharging and holding end of the baling chamber, will result in forcing the completed bales from the discharging end of the press from which, of course, they must be taken in the usual way by an attendant. It will be seen therefore that with our improved automatic bale tying press the work of compressing and tying the material in bales may be practically continuous with no loss of time in operation or for tying and that the tying operation will be performed without the expenditure of any manual labor except for the hand tripping operation described, and it will be further seen that the only attention the press will require will be to feed the material undergoing compression into the hopper and to remove the completed bales from the discharge end of the chamber.

We claim:

1. The combination in a baling press having a baling chamber and a compression plunger reciprocally mounted therein, of a bale wire tying and cutting device, a plurality of wire carrying needles movable across said chamber for co-operating with said bale wire tying and cutting device, a reciprocable frame to which said needles are rigidly attached, said frame comprising an elongated member having also vertical extension and being peripherally toothed on both its longitudinal and vertical sides, a stationary frame projecting laterally from one side of the baling chamber for supporting said needle frame to reciprocate therein, a shiftable needle operating gear engaging the peripherally toothed portion of said needle frame, a rotatable driving gear, means for actuating said plunger from said driving gear, means for actuating said needle operating gear for reciprocating said needle carrying frame, comprising a mutilated gear carried by said rotatable driving gear, and a shiftable gear connection interposed between the said mutilated gear and the said needle operating gear, cams on the reciprocable needle frame and upon its said supporting frame for bodily controlling the shifting movement of the needle operating gear, and means for operating said bale wire tying and cutting device operably connected with said needle operating gear in a manner to be actuated by the bodily shifting movements of said gear.

2. The combination in a baling press having a baling chamber and a compression plunger reciprocally mounted therein, of a bale wire tying and cutting device, of a wire carrying needle movable across said chamber, a reciprocable frame to which said needle is rigidly attached, said frame comprising an elongated member having longitudinal and vertical sides and being peripherally toothed on both its longitudinal and vertical sides, a stationary frame projecting laterally from one side of the baling chamber for supporting said needle frame to reciprocate therein, a shiftable needle operating gear for engaging the peripherally toothed portion of said needle frame, a rotatable driving gear, means actuating said plunger from said driving gear, means for actuating said needle operating gear for reciprocating said needle carrying frame comprising a mutilated gear carried by said rotatable driving gear, a shiftable gear for co-operating with the mutilated gear on the rotatable driving gear, a shaft operably connected with the shiftable gear and extending along the body of the baling chamber toward a point adjacent the reciprocable needle frame, the free end of the shaft being adapted to have universal movement and carrying the said needle operating gear in engagement with the peripherally toothed portion of the needle carrying frame, cam guides for guiding the free end of the driving shaft and the needle operating gear carried thereby, and means for operating said bale wire tying and cutting device operatively connected with and actuated by the bodily shifting movements of the free end of said shaft and the needle operating gear carried thereby.

3. The combination in a baling press comprising a baling chamber, baling wire tying and severing means carried at one side of the baling chamber, a plurality of baling wire needles reciprocably mounted on the side of the baling chamber opposite the said wire tying and severing devices, the said needles being adapted to traverse the baling chamber to carry baling wires to the said wire tying and severing devices, a reciprocable plunger within the chamber, there being a plurality of transversely extending slots in the plunger corresponding to the number of baling wire needles adapted to be interposed in the path of said needles, means for reciprocating said baling wire needles to cause them to traverse said slots in the said plunger, there being a depression formed on each side of the said plunger at the ends of the said slots in the plunger, spring controlled dogs mounted on the side walls of the chamber for engaging the compression end of material being acted upon by said plunger, and means operable in synchronism with said baling wire needles for operating said wire tying and severing means.

4. The combination in a baling press comprising a baling chamber, baling wire tying and severing means carried at one side of the baling chamber, a plurality of baling wire needles reciprocably mounted on the side of the baling chamber opposite the said wire tying and severing means, the said needles being adapted to traverse the baling chamber to carry baling wires to the said wire tying and severing devices, a reciprocable plunger within the chamber for compressing materials therein, there being a plurality of transversely extending slots in the plunger corresponding to the number of baling wire needles, said slots being adapted to be interposed in the path of said needles, means for reciprocating said needles to cause them to traverse said slots in said plunger, there being depressions formed on each side of said plunger at the ends of said slots in the plunger, a plurality of spring controlled dogs mounted on the side walls of the chamber and being adapted to cooperate with said depressions in the compression wall of the plunger, one of said spring controlled dogs being in the form of a relatively thin hook adapted to enter through the side wall of the chamber at a point adjacent to the said baling wire tying and severing means, and means operable in synchronism with the said plunger for positively moving the said spring controlled dogs adjacent the wire tying and severing means upon the compression stroke of the plunger.

5. The combination in a baling press comprising a baling chamber, baling wire tying and severing means carried at one side of the baling chamber, a plurality of baling wire needles reciprocably mounted on the side of the baling chamber opposite the said wire tying and severing devices, the said needles being adapted to traverse the baling chamber to carry baling wires to the said wire tying and severing devices, a reciprocable plunger within the chamber, and a plurality of spring pressed dogs, each provided with inwardly extending spaced-apart projections adapted to extend on the inside of the baling chamber and to permit the passage between the spaced-apart portions thereof of baling wires carried by said needles and said wire tying and severing means.

6. The combination in a baling press comprising a baling chamber, of baling wire tying and severing means carried at one side of the baling chamber, a plurality of baling wire needles reciprocably mounted on the side of the baling chamber opposite the said wire tying and severing devices, the said needles being adapted to traverse the baling chamber to carry wires transversely of the chamber to the said wire tying and severing devices, means for rigidly securing said needles together comprising interconnecting bars, a peripherally toothed rack member secured thereto, a frame provided with a guide for reciprocably supporting said needles, the said frame being provided with cam guides, other cam guides on the needle frame adjacent the said rack thereon, a floating gear adapted to have sliding movement in the cam guide of the said supporting frame, means for operating the said plunger, and means operable by the plunger operating means for operating the said floating gear in engagement with the said needle rack to impart reciprocating movement to said needles.

7. The combination in a baling press comprising a baling chamber, of baling wire tying and severing means carried at one side of the baling chamber, a plurality of baling wire needles reciprocably mounted on the side of the baling chamber opposite the said wire tying and severing devices, the said needles being adapted to traverse the baling chamber to carry wires transversely of the chamber to the said wire tying and severing devices, means for rigidly securing said needles together comprising interconnecting bars, a peripherally toothed rack member secured thereto, a frame provided with a guide for reciprocably supporting said needles, the said frame being provided with cam guides, other cam guides on the needle frame adjacent the said rack thereon, a floating gear adapted to have sliding movement in the cam guide of the said supporting frame, means for operating the said plunger, means operable by the plunger operating means for operating the said floating gear in engagement with the said needle rack to impart reciprocating movement to said needles, and means operably connected with the said gear which actuates the needle rack for imparting movement to the said wire tying and severing means.

8. The combination in a baling press comprising a baling chamber, of baling wire tying and severing means carried at one side of the baling chamber and comprising a reciprocating rack and rotary twisting and severing devices, a plurality of baling wire needles rigidly secured together by interconnecting frame members, a peripherally toothed rack gear carried by said frame members, a guide frame extending rigidly from the side of the baling chamber opposite the side carrying the wire tying and severing means, for reciprocably supporting said needle frame, a floating gear engaging said needle rack, means for operating said floating gear, and means operable by the shifting movements of said floating gear for operating said baling wire tying and severing means.

9. The combination in a baling press comprising a baling chamber, baling wire tying and severing means carried at one side of the baling chamber, a plurality of baling wire needles reciprocably mounted upon a rigid frame extending laterally on the side of the baling chamber opposite the said wire tying and severing devices, the said needles being adapted to traverse the baling chamber to carry baling wires to the said wire tying and severing device, a reciprocable plunger within the chamber, driving gearing for operating the said plunger, gearing interposed between the said driving gearing and the said baling wire needles for operating the latter in synchronism with the movements of the said plunger, said means comprising a reciprocating peripherally toothed needle carrying frame with an associated driving pinion engaging said toothed frame, and means including a pivoted walking beam extending laterally across the baling chamber and connected to be operable in synchronism with the needle operating means for operating the said baling wire tying and severing means.

10. The combination in a baling press comprising a baling chamber, baling wire tying and severing means carried at one side of the baling chamber, a plurality of baling wire needles reciprocably mounted on the side of the baling chamber opposite the said wire tying and severing devices, the said needles being adapted to traverse the baling chamber to carry baling wires to the said wire tying and severing devices, a reciprocable plunger within the chamber, driving gearing for operating the said plunger, gearing interposed between the said driving gear and the said bailing wire needles for operating the latter in synchronism with the movements of the said plunger, and means operable in synchronism with the needle operating means for operating the said baling wire tying and severing means, said means comprising a pivoted walking beam connected with the needle operating means on the side of the chamber opposite the said wire tying and severing means and extending thence to a position adjacent the said baling wire tying and severing means on the opposite side of the chamber and having operative connection with said wire tying and severing means.

11. The combination in a baling press including a baling chamber of a compression plunger reciprocally mounted therein, a rotary member operatively connected with said compression plunger for reciprocating the latter, a wire tying and severing device operatively mounted on one side of the baling chamber, a plurality of wire carrying needles mounted on the opposite side of the chamber and movable across said chamber into operative relation with said wire cutting and tying device, a peripherally toothed rack member operatively connected with said needles, a floating drive shaft carrying a drive pinion engaging the toothed periphery of the said needle rack, a reciprocating toothed rack bar for operating said wire tying and cutting devices, a pivoted lever having operative connection with the said rack for operating the said wire tying and severing device, a pitman connection between the opposite end of the said lever and the said floating shaft for operating the said needle rack gear, and a shiftable gear connection between the said plunger driving member and the said floating shaft for operating the needle rack gear and the said wire tying and cutting device in synchronism with the movements of the said compression plunger.

12. The combination in a baling press including a baling chamber of a compression plunger reciprocally mounted therein, a plurality of wire carrying needles movable across said chamber, a plurality of wire tying and severing devices mounted on the baling chamber wall to co-operate with said needles, an elongated polygonal rack bar carried by said needles and being toothed on its outer periphery, a floating drive shaft carrying a gear engaging the periphery of the said rack and imparting reciprocatory movement to said needles, cam devices for restricting the oscillations of said gear on said floating driving shaft, a reciprocating rack bar for operating the said wire tying and severing devices, a pivoted walking beam having one end connected with the said rack bar for operating the wire tying and severing devices, a pitman connection interposed between the said floating shaft and walking beam for operating the needle rack, the said pitman connection being arranged to exert a positive pull upon the free end of the said tier and cutting mechanism operating walking beam, and resilient means interposed between the said pitman and the free end of the walking beam to provide a resilient connection by which the said walking beam is operated in the reverse direction through the said pitman by the oscillations of said floating drive shaft and drive pinion carried thereon as the said drive pinion travels around the periphery of the needle rack gear.

13. The combination in a baling press including a baling chamber, of a compression plunger reciprocally mounted therein, driving means for operating said plunger comprising a pitman and a rotary member connected therewith, a wire cutting and tying device, a needle movable across said chamber for carrying baling wires into co-operative relation with said tier and cutter mechanism, and means for operating said needle and said cutter and tier mechanisms comprising a mutilated gear member secured to the said rotary means for operating the compression plunger, guide surfaces on the said mutilated gear member, a shiftable driving pinion provided with a cam surface and with gear teeth for operative engagement with the cam surfaces and teeth on the said mutilated gear, and operative connections between the said pinion and said needles and tier and cutter mechanisms for operating each of them.

14. The combination in a baling press including a baling chamber of a compression plunger reciprocally mounted therein, driving means for operating said plunger comprising a pitman and a rotary member connected therewith, a wire cutting and tying device, a needle movable across said chamber for carrying baling wires into co-operative relation with said tier and cutter mechanism, and means for operating said needle and said cutter and tier mechanisms comprising a mutilated gear member secured to said rotary member which operates the said compression plunger and a rotary shaft extending longitudinally of the baling chamber between the said mutilated gear member and the said needle and tier and cutter operating devices, there being a shiftable gear operatively connected with the said shaft and being adapted for shifting into engaging relation with said mutilated gear member.

15. The combination in a baling press including a baling chamber, of a compression plunger reciprocably mounted therein, driving means for operating said plunger comprising a pitman and a rotary member connected therewith, a wire cutting and tying device, a needle movable across said chamber for carrying baling wires into co-operation with said tier and cutter mechanism, a pair of spring pressed dogs mounted upon the wall of the compression chamber adjacent said cutter and tier mechanisms, an oscillatory cam for moving said spring pressed dogs out of the path of material being compressed by the plunger, and means connected with said oscillatory cam and with a cam which is operated in synchronism with the said rotary member which operates said plunger whereby to move said spring pressed dogs to an inoperative position upon each successive compression stroke of the plunger.

16. The combination in a baling press including a baling chamber and a compression plunger, of a wire twisting and severing device comprising a pair of co-operating slotted members rotatable upon a common axis in juxtaposition to each other, means for feeding two strands of wire synchronously through the slotted portions of said rotatable members, means including a reciprocating rack for imparting rotation to one of the said slotted members for twisting the double strands of wire held in the said co-operating slots of both members, the other slotted member being free to rotate with the positively actuated member of the cutting and twisting device, means for locking the other of the said slotted, rotary twisting and cutting members against rotation at the conclusion of the wire twisting operation to provide a shearing action for cutting the double twisted wire strands within the portions of said strands held within the said slots of the rotary cutting and twisting members, the said operating means comprising a reciprocating rack in engagement with gear teeth on the positively actuated one of the cutting and twisting members whereby to divide the said double twisted strands of baling wire into a closed bale tie and a partially formed open bale tie, a longitudinally movable wire tensioning device engaging one wire strand on the wire feeding side of the cutting and twisting device, and elastic means operatively connected with the wire tensioning device and tending normally to pull the wire from the said cutting and twisting members whereby to free the cut and twisted double strands on the wire feed side of the device from its slot in the wire twisting and cutting device to prevent reversely twisting the severed ends of the strands upon the reverse reciprocation of the cutter and twister actuating rack bar.

17. Wire cutter and tier devices adapted for use in an automatic baling press comprising a reciprocating toothed rack bar, a slotted rotary gear operatively engaging the said rack bar and adapted to be rotated thereby, the said rotary gear being provided with a wire cutting edge adjacent the said slotted portion which is positioned within an axial recess intersecting said slotted portion, a second slotted tubular member co-axially mounted with the said slotted rotary gear member and being provided with an axial lateral extension rotatably nested within the aforesaid axial recess in the rotary gear and having a cutting or shearing edge at the terminus of the slot therein and being adapted to co-operate with the aforesaid cutting edge of the gear member, and locking means adapted to be actuated by the reciprocation of the said rack bar whereby to lock the said second slotted tubular member to provide a shearing action between the said co-axially mounted wire tying and severing devices.

18. A wire tying and severing device adapted for use on baling presses comprising a pair of slotted coaxially mounted tubular members arranged in end to end relation, a gear on one of the said tubular members, a rack bar engaging said gear for imparting synchronous rotation to said co-axially slotted tubular members when a pair of baling wires are positioned in said slots therein in parallel relation for imparting twists to said wires, wire cutting edges formed on the respective tubular members in shearing relation, a circular disc carried by the said cutting and twisting member that is associated with the said tubular member provided with driving gearing, the said disc being provided with a radial shoulder, and a pivoted lever provided with a pawl for engaging the notched portion of the disc, the said lever being arranged to be operated by the reciprocatory movement of the tier operating rack gear whereby to lock the said disc and its associated slotted tubular member near the end of the twisting movement of the wire tying device whereby a shearing action upon the wire is produced by the further rotation of the tubular member carrying the gear.

19. The combination in a baling press including a baling chamber, of a compression plunger, a wire cutting and tying device, a needle movable across said chamber for carrying a baling wire into cooperative relation with said tier and cutter mechanism, said needle being provided with a pair of spaced apart slotted wire carrying branches, one of which is provided with a closed eyelet for securing the baling wire therein, the said wire cutting and tying device comprising a pair of slotted tubular members provided with co-operating shearing devices, means for positively operating one of said tubular members whereby to twist the baling wires in the slots of said tubular members, means operated by the said means which imparts rotation to the wire cutting and tying device for locking one of the said tubular members against rotation at the close of the wire tying movement of the said tubular members, there being a slot in one of the said tubular members and a spring actuated locking plunger provided with means for normally engaging the wires within the said cutting and tying device and carrying also a pawl member adapted to engage the slot in the said tubular member to position the latter upon the withdrawal of the cut and tied ends of the wire upon the completion of the bale tying operation.

20. The combination in a baling press including a baling chamber, of a compression plunger reciprocably mounted therein, a rotary member operatively connected with said compression plunger for reciprocating the latter, a wire tying and severing device operatively mounted on one side of the baling chamber, a plurality of wire carrying needles mounted on the opposite side of the chamber and movable across said chamber into operative relation with said wire cutting and tying device, and means for operatively connecting the said rotary member which operates the plunger with the said needles and said wire tying and severing devices comprising a driving shaft operatively connected with said needles, a relatively short rotary shaft geared to the said driving shaft and carrying at its free end adjacent said rotary member a short shaft section hingedly connected therewith and having a bevel pinion secured to the free end thereof, a mutilated cam gear carried by the said rotary member adjacent to and in the path of movement of the said bevel pinion on the pivoted section of the last said shaft, said mutilated cam gear comprising a relatively circular disc provided on one face thereof with a segmental toothed rack gear adapted to be engaged by the teeth of the said bevel pinion, a segmental cam track on the said mutilated cam gear connecting the extremities of the said segmental rack gear, there being a camming portion on the said pinion adapted to engage the said cam track, an oscillating member mounted adjacent the said hinged section of the short needle and tier drive shaft adjacent the said mutilated cam gear for engaging the said hinged and beveled gear carrying portion of the said short drive shaft for enabling the said bevel pinion to be engaged with and disengaged from the said mutilated cam driving gear, elastic means tending normally to hold the said hinged end of the shaft carrying the bevel driving pinion in an inoperative position with respect to the said mutilated driving gear, elastic means tending to hold the said movable member which controls the hinged portion of the said short drive shaft carrying the beveled gear to a position away from the said mutilated cam gear, a plurality of segments of peripheral cam tracks on said mutilated driving gear, and means carried by said shiftable member for engagement with the said peripheral cam tracks on the driving gear for controlling the shifting movements of the said shiftable bevel gear to its relatively in and out of gear positions with respect to said mutilated cam gear.

HARRY B. CLAAR.
BOYD C. COMER.